US012645226B2

(12) United States Patent
Morohoshi

(10) Patent No.: US 12,645,226 B2
(45) Date of Patent: Jun. 2, 2026

(54) MOBILE OBJECT CONTROL SYSTEM, INFORMATION PROCESSING APPARATUS, AND MOBILE OBJECT

(71) Applicant: Hiroshi Morohoshi, Kanagawa (JP)

(72) Inventor: Hiroshi Morohoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 182 days.

(21) Appl. No.: 18/597,992

(22) Filed: Mar. 7, 2024

(65) Prior Publication Data

US 2024/0319739 A1 Sep. 26, 2024

(30) Foreign Application Priority Data

Mar. 20, 2023 (JP) ................................. 2023-044618

(51) Int. Cl.
| | |
|---|---|
| *G05D 1/617* | (2024.01) |
| *G05D 1/69* | (2024.01) |
| G05D 105/55 | (2024.01) |
| G05D 107/20 | (2024.01) |
| G05D 109/10 | (2024.01) |
| G05D 109/20 | (2024.01) |

(52) U.S. Cl.
CPC .............. *G05D 1/617* (2024.01); *G05D 1/69* (2024.01); *G05D 2105/55* (2024.01); *G05D 2107/22* (2024.01); *G05D 2109/10* (2024.01); *G05D 2109/20* (2024.01)

(58) Field of Classification Search
CPC ...... G05D 1/617; G05D 1/69; G05D 2105/55; G05D 2107/22; G05D 2109/10; G05D 2109/20; G05D 1/692; G05D 1/6987; G05D 1/6482; G05D 2109/254; G05D 1/689; B64U 2101/31; B64U 2101/40; B64U 2101/47; B64U 2201/00
See application file for complete search history.

(56) References Cited

U.S. PATENT DOCUMENTS

| | | | | | |
|---|---|---|---|---|---|
| 5,832,187 | A | * | 11/1998 | Pedersen et al. | ...... G06Q 10/06 |
| 2018/0374353 | A1 | * | 12/2018 | Hosokawa et al. | .... G08G 1/162 |

FOREIGN PATENT DOCUMENTS

| | | |
|---|---|---|
| JP | 2017-004101 A | 1/2017 |
| JP | 2021-026351 A | 2/2021 |
| JP | 2021-166074 A | 10/2021 |

* cited by examiner

*Primary Examiner* — Brodie J Follman
(74) *Attorney, Agent, or Firm* — XSENSUS LLP

(57) ABSTRACT

A mobile object control system, an information processing method, and a mobile object. The mobile object control system includes one or more mobile objects, an information processing apparatus communicable with the one or more mobile objects, and control the one or more mobile objects. The information processing apparatus includes first circuitry configured to store area information including past event occurrence history information of an area to be searched and weather information regarding the area, determine a designated area to search based on the area information and the weather information, and control the movement of at least one of the one or more mobile objects based on the designated area. The one or more mobile objects include second circuitry configured to detect an occurrence of an event while moving in the designated area, and send a notification in case that detecting the occurrence of the event.

15 Claims, 15 Drawing Sheets

Figure 2:
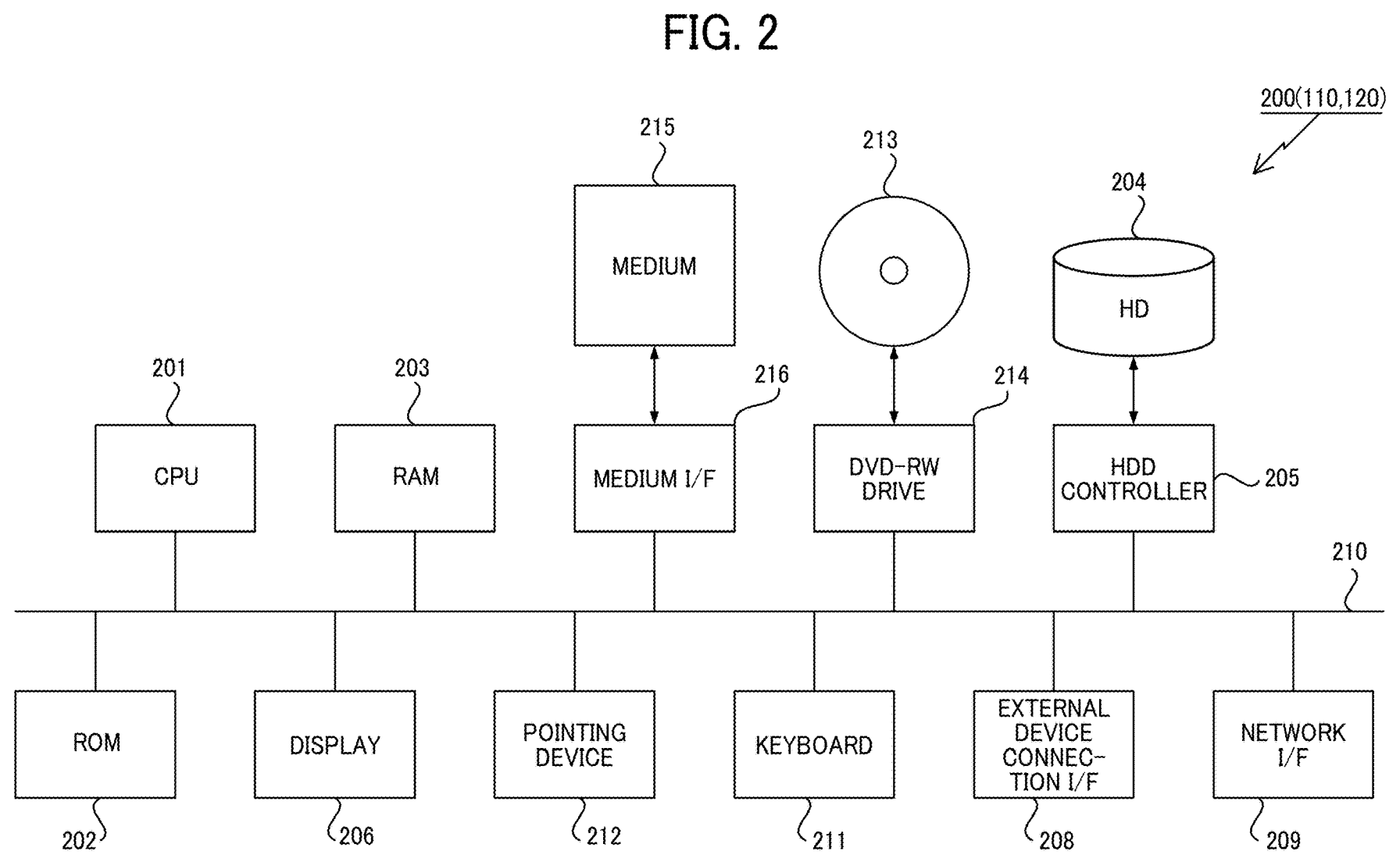

| Label | Block |
|-------|-------|
| 201 | CPU |
| 202 | ROM |
| 203 | RAM |
| 206 | DISPLAY |
| 212 | POINTING DEVICE |
| 211 | KEYBOARD |
| 209 | NETWORK I/F |
| 208 | EXTERNAL DEVICE CONNECTION I/F |
| 205 | HDD CONTROLLER |
| 204 | HD |
| 214 | DVD-RW DRIVE |
| 213 | (disc) |
| 216 | MEDIUM I/F |
| 215 | MEDIUM |
| 210 | (bus) |

250(152,162)

251 CPU

252 ROM

253 RAM

254 STORAGE UNIT

255 WIRELESS I/F

256 MEDIUM I/F

257 EXPANSION I/F

260 DRIVING DEVICE

261 IMAGING DEVICE

262 DISTANCE MEASUREMENT SENSOR

263 VARIOUS SENSORS

264 GPS RECEIVER

265 POWER SUPPLY UNIT

300

310

312 UI UNIT

314 DETERMINATION UNIT

316 AREA DETERMINATION UNIT

318 MOVEMENT PATTERN DETERMINATION UNIT

320 CONTROL UNIT

330 COMMUNICATION UNIT

322 WEATHER INFORMATION ACQUISITION UNIT

324 INFORMATION STORAGE UNIT

326 FIRE SPECIFICATION UNIT

328 PLAN GENERATION UNIT

350

352 RECEPTION UNIT

354 CONTROL UNIT

356 DETECTION UNIT

358 NOTIFICATION UNIT

360 POWER MANAGEMENT UNIT

362 LOCATION SPECIFICATION UNIT

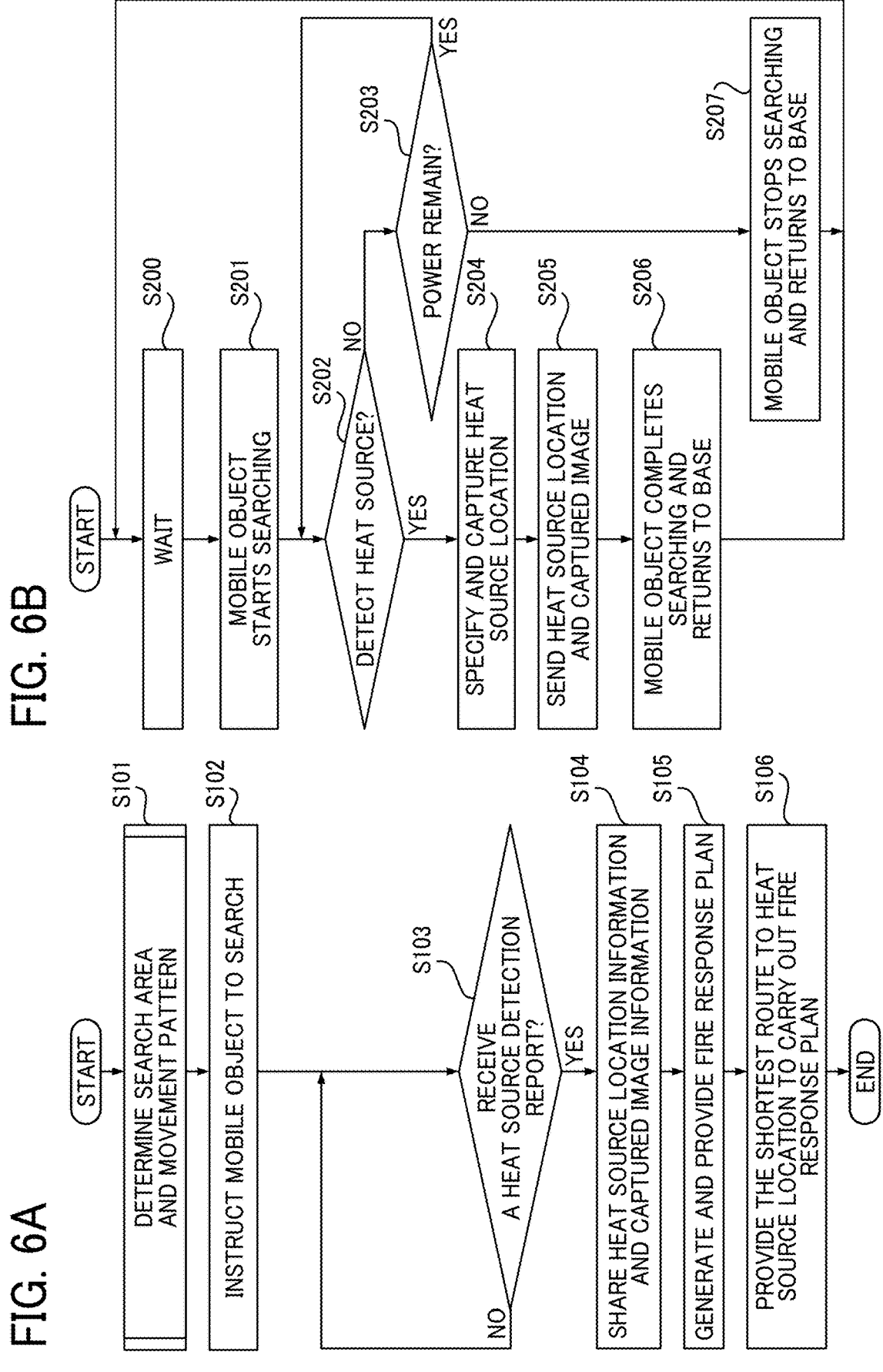

FIG. 6A

START

S101 — DETERMINE SEARCH AREA AND MOVEMENT PATTERN

S102 — INSTRUCT MOBILE OBJECT TO SEARCH

S103 — RECEIVE A HEAT SOURCE DETECTION REPORT?
NO
YES

S104 — SHARE HEAT SOURCE LOCATION INFORMATION AND CAPTURED IMAGE INFORMATION

S105 — GENERATE AND PROVIDE FIRE RESPONSE PLAN

S106 — PROVIDE THE SHORTEST ROUTE TO HEAT SOURCE LOCATION TO CARRY OUT FIRE RESPONSE PLAN

END

FIG. 6B

START

S200 — WAIT

S201 — MOBILE OBJECT STARTS SEARCHING

S202 — DETECT HEAT SOURCE?
NO
YES

S203 — POWER REMAIN?
YES
NO

S204 — SPECIFY AND CAPTURE HEAT SOURCE LOCATION

S205 — SEND HEAT SOURCE LOCATION AND CAPTURED IMAGE

S206 — MOBILE OBJECT COMPLETES SEARCHING AND RETURNS TO BASE

S207 — MOBILE OBJECT STOPS SEARCHING AND RETURNS TO BASE

FIG. 9

| AREA | NUMBER OF PAST FIRES | INCLUDING FIRE HANDLING AREAS | WEATHER | HUMIDITY | WIND SPEED | WIND DIREC-TION | MOVEMENT PATTERN | MOVEMENT TIME PERIOD |
|---|---|---|---|---|---|---|---|---|
| AREA A | 5 | Y | SUNNY | 20 % | 10 m/s | NORTH WIND | 1 | AM |
| AREA B | 3 | X | SUNNY | 30 % | 8 m/s | NORTH WIND | 1 | AM |
| AREA C | 1 | X | CLOUDY | 60 % | 2 m/s | WEST WIND | 2 | PM |
| AREA D | 2 | X | CLOUDY | 50 % | 2 m/s | WEST WIND | 3 | PM |

FIG. 10B
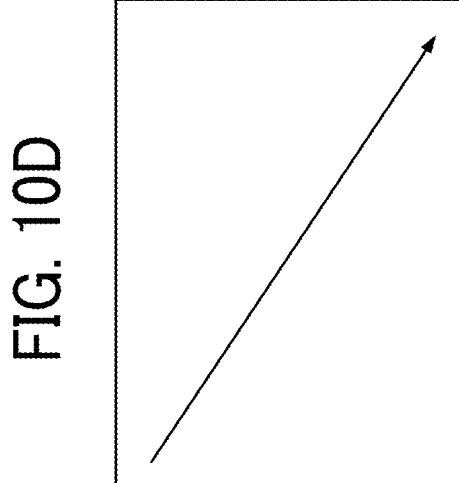
FIG. 10D
FIG. 10A
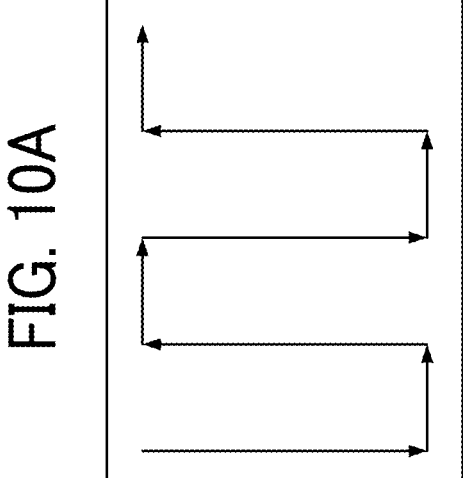
FIG. 10C
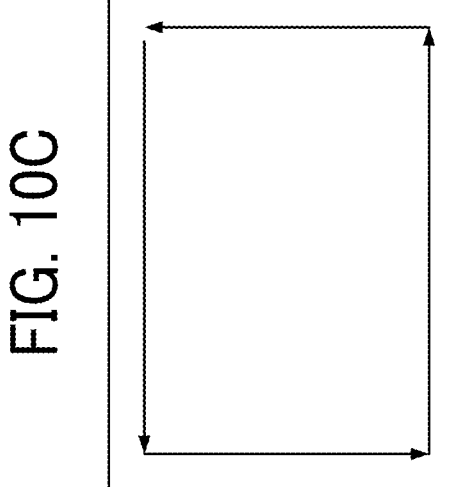

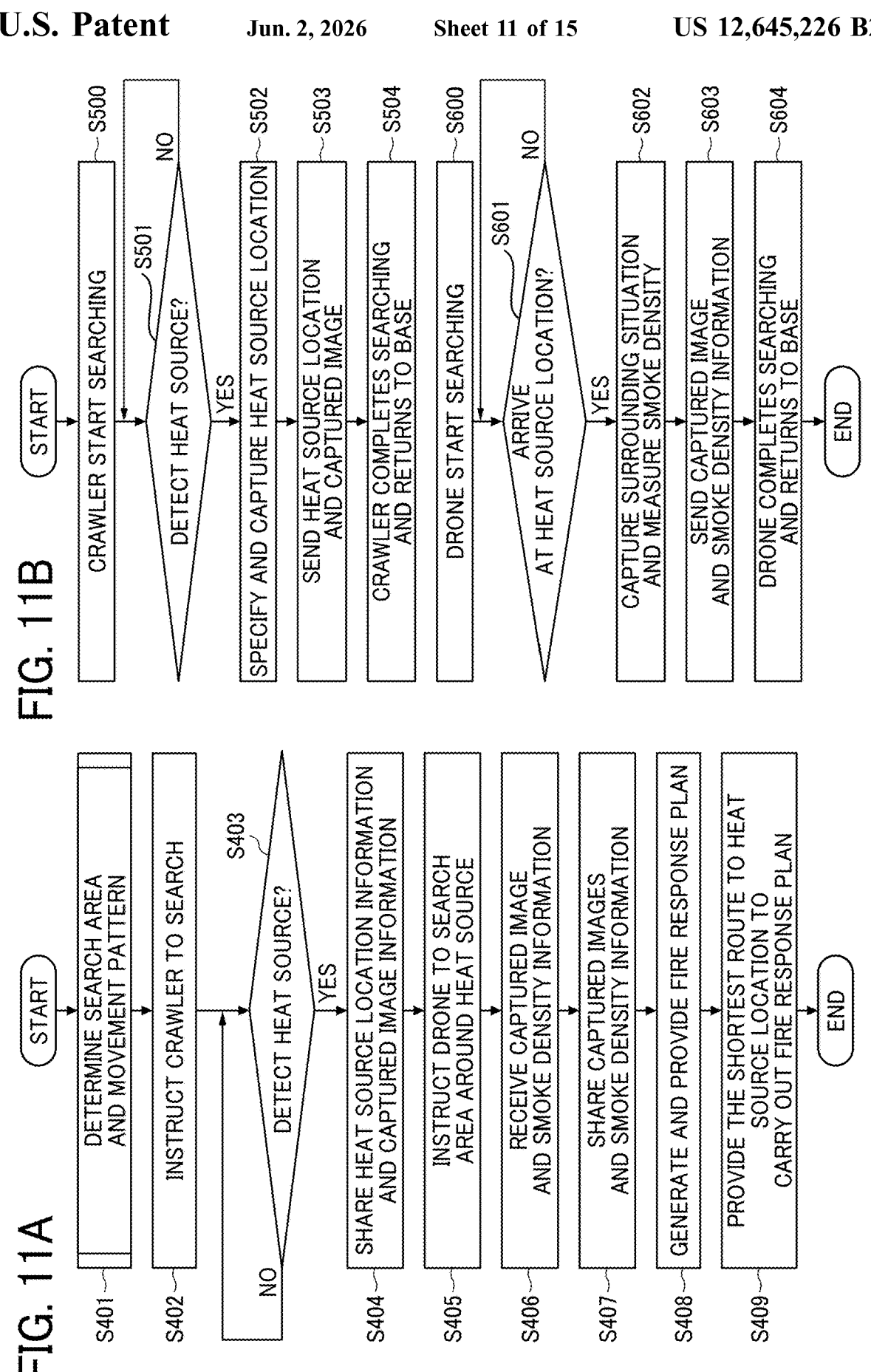

FIG. 11B

S500 — CRAWLER START SEARCHING

S501 — DETECT HEAT SOURCE?

S502 — SPECIFY AND CAPTURE HEAT SOURCE LOCATION

S503 — SEND HEAT SOURCE LOCATION AND CAPTURED IMAGE

S504 — CRAWLER COMPLETES SEARCHING AND RETURNS TO BASE

S600 — DRONE START SEARCHING

S601 — ARRIVE AT HEAT SOURCE LOCATION?

S602 — CAPTURE SURROUNDING SITUATION AND MEASURE SMOKE DENSITY

S603 — SEND CAPTURED IMAGE AND SMOKE DENSITY INFORMATION

S604 — DRONE COMPLETES SEARCHING AND RETURNS TO BASE

FIG. 11A

S401 — DETERMINE SEARCH AREA AND MOVEMENT PATTERN

S402 — INSTRUCT CRAWLER TO SEARCH

S403 — DETECT HEAT SOURCE?

S404 — SHARE HEAT SOURCE LOCATION INFORMATION AND CAPTURED IMAGE INFORMATION

S405 — INSTRUCT DRONE TO SEARCH AREA AROUND HEAT SOURCE

S406 — RECEIVE CAPTURED IMAGE AND SMOKE DENSITY INFORMATION

S407 — SHARE CAPTURED IMAGES AND SMOKE DENSITY INFORMATION

S408 — GENERATE AND PROVIDE FIRE RESPONSE PLAN

S409 — PROVIDE THE SHORTEST ROUTE TO HEAT SOURCE LOCATION TO CARRY OUT FIRE RESPONSE PLAN

NETWORK

FIG. 15

| REGISTERED MANUAL OPERATION DEVICE NAME | RECOMMENDED AREA |
|---|---|
| HAPTIC DEVICE | AREA A |
| KEYBOARD | — |
| CONTROLLER 1 | — |
| CONTROLLER 2 | — |
| POINTING DEVICE | — |

MOBILE OBJECT CONTROL SYSTEM, INFORMATION PROCESSING APPARATUS, AND MOBILE OBJECT

CROSS-REFERENCE TO RELATED APPLICATION

This patent application is based on and claims priority pursuant to 35 U.S.C. § 119(a) to Japanese Patent Applications No. 2023-044618, filed on Mar. 20, 2023, in the Japan Patent Office, the entire disclosure of which is incorporated by reference herein.

BACKGROUND

Technical Field

The present disclosure relates to a mobile object control system, information processing apparatus, mobile object.

Background Art

In recent years, wildfires have been occurring all over the world due to climate changes such as global warming. In Japan, on average, approximately 1,200 fires occurred per year between 2015 and 2019, with approximately 700 hectares destroyed and damage amounting to approximately 360 million yen. Once wildfires spread, it takes a huge amount of effort to extinguish them, and the damage tends to be large. Additionally, it takes decades for forests to recover, and the cost of recovery tends to be enormous. Therefore, there is a strong need to detect wild occurrences of fires at an early stage and prevent the spread of fires.

With the recent development of unmanned flying mobile object technology such as drones, systems are already known that use drones to provide evacuation guidance and provide disaster prevention warnings in the event of disasters including the above-mentioned wildfires.

SUMMARY

Embodiments of the present disclosure describe a mobile object control system, information processing apparatus, and mobile object.

According to one embodiment, a mobile object control system comprising: one or more mobile objects, an information processing apparatus communicable with the one or more mobile objects and to control the one or more mobile objects. The information processing apparatus includes first circuitry configured to store area information including past event occurrence history information of an area to be searched by the one or more mobile objects and weather information regarding the area, determine a designated area to search based on the area information and the weather information, and control the movement of at least one of the one or more mobile objects based on the designated area. The one or more mobile objects include second circuitry configured to detect occurrence of event while moving in the designated area, and send a notification in case that detecting the occurrence of the event.

According to another embodiment, an information processing apparatus communicable with one or more mobile objects and for controlling the one or more mobile objects includes first circuitry configured to store area information including past event occurrence history information of an area to be searched by the one or more mobile objects and weather information regarding the area, determine a designated area to search based on the area information and the weather information, control a movement of at least one of the one or more mobile objects based on the designated area, receive information about an occurrence of an event detected while the at least one mobile object is moving in the designated area, sent from the at least one mobile object, and in case that the information is received, notify the occurrence of the event to administrator.

According to yet another embodiment, a mobile object for communicating with an information processing device via a network and operated under the control of an information processing apparatus includes circuitry configured to specify a location of the mobile object control the movement of the mobile object based on the location information in response to an instruction based on a designated area determined by the information processing apparatus based on area information including past event occurrence history information of an area to be searched and weather information regarding the area, detect an occurrence of an event while the mobile object is moving in the designated area, and send a notification in case that the occurrence of the event is detected.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a hardware configuration diagram of a personal computer (PC) that can be used as the mobile object control server and the weather information server that constitute the disaster prevention system according to embodiments of the present disclosure.

FIGS. 6A and 6B are flowcharts illustrating mobile object control processing executed by the disaster prevention system according to embodiments of the present disclosure.

FIG. 9 is a diagram illustrating a table that stores area information and weather information in the disaster prevention system according to embodiments of the present disclosure.

FIGS. 10A-10D are diagrams illustrating movement patterns of a moving object determined according to embodiments of the present disclosure.

FIGS. 11A and 11B are flowcharts illustrating mobile object control process executed by the disaster prevention system according to another embodiment.

FIG. 15 is a diagram illustrating a table that stores recommended areas for various operating devices in another embodiment.

Figure 1:
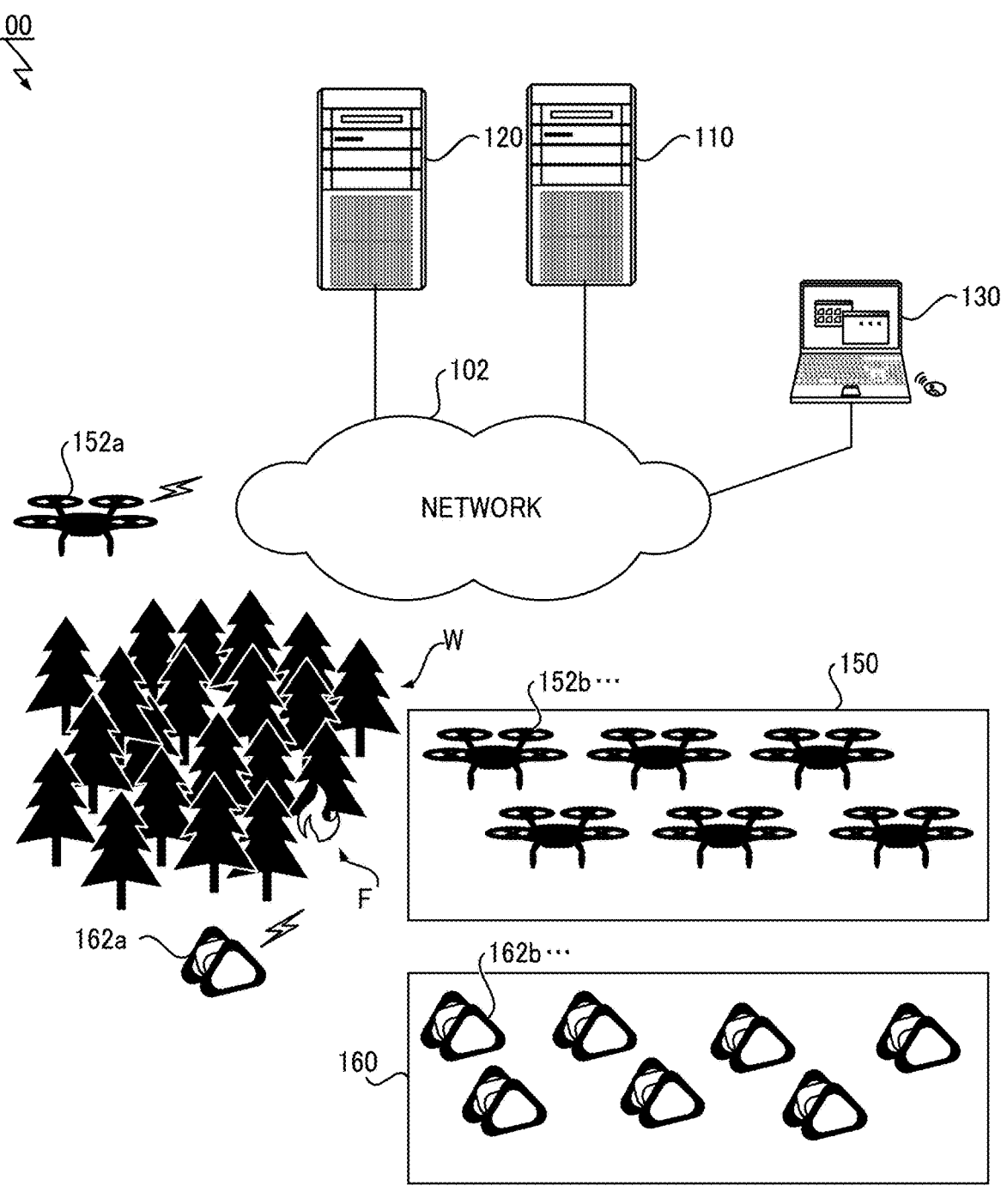
FIG. 1 is a diagram illustrating an overall configuration of a disaster prevention system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Exemplary embodiments of a mobile object control system, information processing apparatus, mobile object are described below in detail with reference to the accompanying drawings. However, the mobile object control system according to embodiments of the present disclosure is not limited to a disaster prevention system that detects the occurrence of forest fires. For example, the mobile object control system may be used for fires other than forest fires, disasters other than fires, and events other than fires or disasters.

FIG. 1 is a diagram illustrating the overall configuration of a disaster prevention system 100 according to embodiments of the present disclosure. As shown in FIG. 1, the disaster prevention system 100 includes a mobile object control server 110 for controlling mobile object, a weather information server 120 for providing weather information, an administrator terminal 130 operated by an administrator who is a user of the mobile object control system, and a plurality of drones 152a, 152b . . . (with a plurality of drones being referred to as drones 152) as unmanned flying mobile objects (only some of the drones are numbered in FIG. 1), and a plurality of crawlers 162a, 162b . . . (with a plurality of crawlers being referred to as crawlers 162) as unmanned ground mobile object (only some of the crawlers are numbered in FIG. 1). These elements in FIG. 1 are each connected to a network 102.

The mobile object control server 110 stores information regarding the forest area W that is the target of monitoring to detect the occurrence of a fire. The mobile object control server 110 is typically deployed as a server or personal computer at an administrator site that monitors the occurrence of a forest fire. However, the mobile object control server 110 is not limited thereto, and may be provided as a virtual machine running on the cloud at any desired location.

The weather information server 120 provides weather information, and particularly provides weather information regarding the forest area W as monitored target. The weather information server 120 may be, for example, a server of an external weather information service that provides weather information (observed values or forecast values such as temperature) for a specific area or for each point in mesh units with a predetermined area. In that case, the mobile object control server 110 may receive weather information related to the forest area W from an external service. Alternatively, the weather information server 120 may be independently implemented at the administrator site.

The administrator terminal 130 is a terminal such as a personal computer, a tablet computer, or a smartphone operated by an administrator. The administrator operates the administrator terminal 130 to access the mobile object control server 110, and perform various settings, select a search area, or instruct the mobile object to search.

The drones 152 (a plurality of drones are collectively referred to by the reference numeral 152) are unmanned flying mobile objects that are externally or autonomously controlled, and is an example of a mobile object in the present embodiment. The drones 152 are on standby at a drone base 150 equipped with charging equipment, and patrol and monitors the forest area W in response to instructions from the mobile object control server 110. The drones 152 each include an imaging device or imager such as a camera, various sensors, and a battery, and return to the drone base 150 to charge by the charging equipment when the remaining battery level falls below a predetermined level. In this way, by combining and utilizing a plurality of drones for aerial surveillance, it becomes possible to monitor vast areas much more cheaply and easily than with aircraft.

The crawlers 162 are each a small rough-terrain mobile object that travels on the ground unmanned and are externally or autonomously controlled, and is an example of the mobile object in the present embodiment. Forest fires can be difficult to detect from the air, especially in densely forested areas, for example if the source of fire is close to the ground or dead tree roots are burning underground. Especially in areas where fires have occurred in the past, it is desirable to be able to detect fires before they spread. By using the crawlers 162 running and patrolling near the ground, in addition to detecting a fire from the air by the drones 152, it becomes possible to improve the accuracy of early detection of the occurrence of a fire. The configuration of the crawlers 162 is not limited as long as it can move by running or walking in the forest, so a caterpillar type, multi-legged type, or wheel type crawler can be used. The crawlers 162 is on standby at a crawler base 160 equipped with the charging equipment, and patrols and monitors the forest area W in response to instructions from the mobile object control server 110. The crawlers 162 include an imaging device or camera and various sensors.

The number of drones 152 and the number of crawlers 162 are each arbitrary, and one or more may be used. The disaster prevention system 100 preferably includes both drones 152 and crawlers 162 as mobile objects, but is not limited to this, and may be configured only with the drones 152 or only with the crawlers 162.

The network 102 includes one or more of each of a local area network (LAN), a wide area network (WAN), a public network such as the Internet, a mobile communication network such as 4G, 5G, and 6G, wireless communication for drones, and a combination thereof. The drones 152 and the crawlers 162 can connect to the network 102 via a radio for radio control operation in the 73 MHz band, an image transmission system for an unmanned mobile object in the 169 MHz band, 2.4 GHZ, or 5.7 GHz band, a specified low power radio station in the 920 MHz band, 1.2 GHz band mobile stations, 2.4 Ghz band power-saving data communication systems, or in any other desired band or frequency. The drones 152 and the crawlers 162 can connect to the network 102 via a mobile communication network such as 4G, 5G, or 6G. The permitted frequency bands may differ depending on the country.

In disaster prevention system 100, the mobile object control server 110 stores information on the forest area W, and analyzes the information together with the weather information provided from the weather information server 120. As a result, it is possible to determine an area or a candidate area to be patrolled and monitored with priority from among a plurality of areas to be monitored, and provide the determined result to the administrator as necessary. In response to automatic determination or selection from the administrator based on the provided area, a designated area to be patrolled and monitored by the mobile object is determined, and instruct to patrol and monitor in the designated area to one or more of the plurality of drones 152 and the plurality of crawlers 162. In response to the instruction, a predetermined number of drones 152 or crawlers 162 or combinations thereof, head from the drone base 150 or crawler base 160 to the designated area and patrol the designated area while attempting to detect a fire. If a fire is detected during the patrol, one or more of the drones 152 or one or more of the crawlers 162 notifies the mobile object control server 110 of the occurrence of the fire via the network 102. The mobile object control server 110 can further notify the administrator terminal 130 in response to the notification of the occurrence of a fire from the mobile object. As a result, an administrator can quickly respond to forest fires.

Hereinafter, before explaining the disaster prevention system 100 according to embodiments of the present disclosure in detail, the hardware configuration of each device that constitutes the disaster prevention system 100 will be explained.

FIG. 2 is a hardware configuration diagram of a personal computer (PC) or server that can be used as the mobile object control server 110 and the weather information server 120 that constitute the disaster prevention system 100 according to embodiments of the present disclosure.

As illustrated in FIG. 2, the server 200 is configured as a computer, and includes a central processing unit (CPU) 201, a Read Only Memory (ROM) 202, a Random Access Memory (RAM) 203, and a Hard Disk (HD) 204, Hard Disk Drive (HDD) controller 205, display 206, external device connection Interface (I/F) 208, network I/F 209, data bus 210, keyboard 211, pointing device 212, Digital Versatile Disk Rewritable (DVD-RW) drive 214, medium 215, and a medium I/F 216.

The CPU 201 controls the operation of the entire server 200. The ROM 202 stores control programs such as an initial program loader (IPL) to boot the CPU 201. The RAM 203 is used as a work area for the CPU 201. The HD 204 stores various data such as programs. The HDD controller 205 controls reading and writing of various data to the HD 204 under the control of the CPU 201. The display 206 displays various information such as a cursor, menu, window, characters, or images. External device connection I/F 208 is an interface for connecting various external devices. The external device is, for example, a Universal Serial Bus (USB) memory, a printer, etc. The network I/F 209 is an interface for data communication using a communication network. The data bus 210 is an address bus, a data bus, and the like for electrically connecting each component such as the CPU 201 illustrated in FIG. 2.

The keyboard 211 is an example of an input device provided with a plurality of keys for enabling a user to input characters, numerals, and various instructions. The pointing device 212 is an example of an input device for selecting and executing various instructions, selecting a processing target, moving a cursor, and the like. The DVD-RW drive 214 reads and writes various data from and to a DVD-RW 213, which is an example of a removable storage medium. The removable storage medium is not limited to the DVD-RW and may be a digital versatile disc-recordable (DVD-R) or the like. The medium I/F 216 controls reading or writing (storing) of data with respect to a storage medium 215 such as a flash memory.

Figure 3:
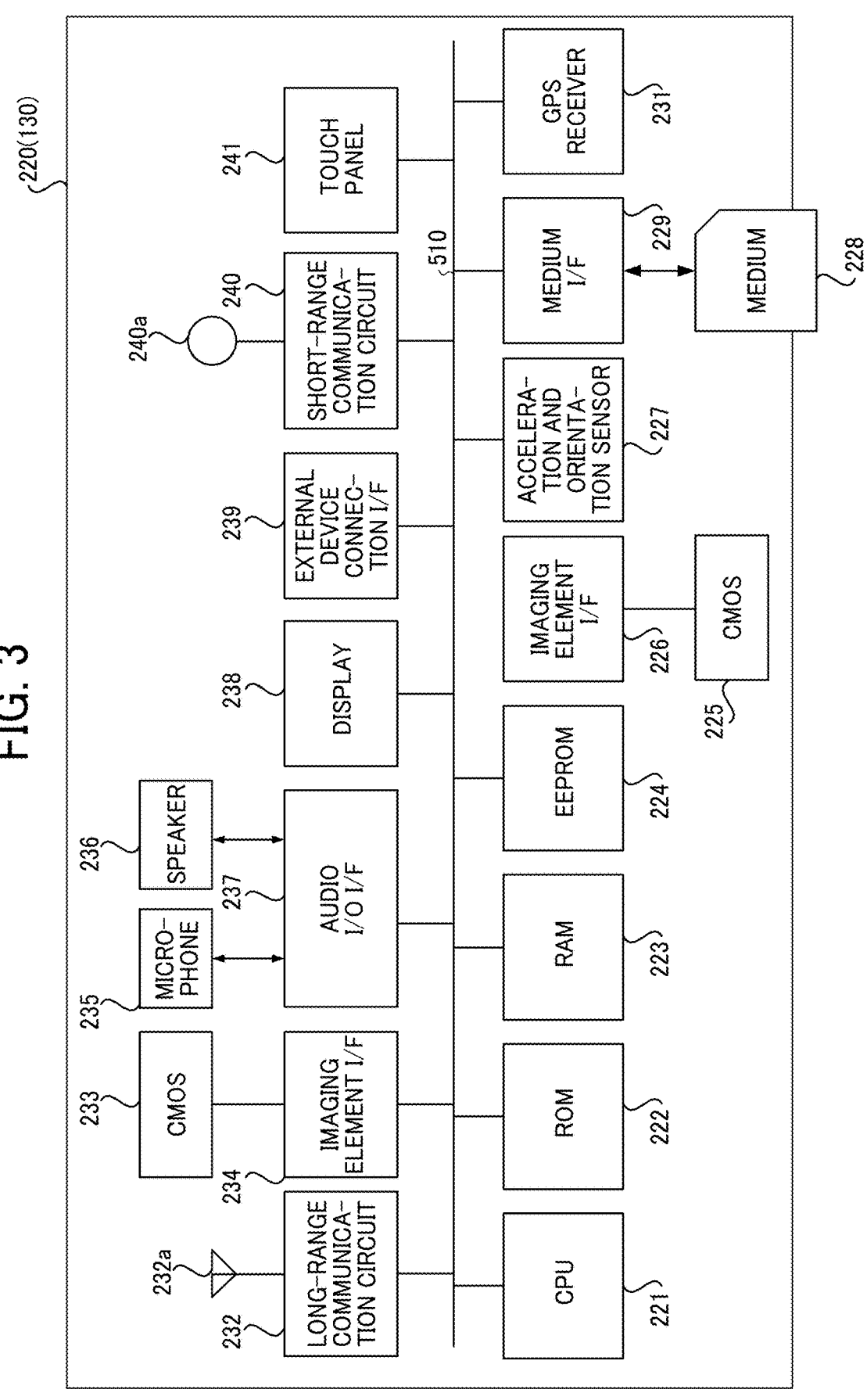
FIG. 3 is a hardware configuration diagram of a smartphone that can be used as an administrator terminal according to embodiments of the present disclosure.

FIG. 3 is a hardware configuration diagram of a smartphone that can be used as an administrator terminal in embodiments of the present disclosure. As illustrated in FIG. 3, the smartphone 220 includes a CPU 221, a ROM 222, a RAM 223, an electrically erasable and programmable ROM (EEPROM) 224, a complementary metal oxide semiconductor (CMOS) sensor 225, an imaging element I/F 226, an acceleration and orientation sensor 227, medium 228, a medium I/F 229, and a Global Positioning System (GPS) receiver 231.

Among these, the CPU 221 controls the operation of the smartphone 220 as a whole. The ROM 222 stores the programs such as IPL used to drive the CPU 221. RAM 223 is used as a work area for CPU 221. The EEPROM 224 reads or writes various data such as smartphone programs under the control of the CPU 221. The CMOS sensor 225 is a type of built-in imaging device that captures a subject (such as a self-portrait or other picture) and acquires image data under the control of the CPU 221. Note that instead of a CMOS sensor, an imaging device such as a Charge Coupled Device (CCD) sensor may be used. The imaging clement I/F 226 is a circuit that controls driving of the CMOS sensor 225. The acceleration and orientation sensor 227 includes one or more of a variety of sensors such as an electronic magnetic compass that detect geomagnetism, a gyro compass, and an acceleration sensor. The medium I/F 229 controls reading or writing (storage) of data to the medium 228 such as a flash memory or any other desired type of memory. The GPS receiver 231 receives GPS signals from GPS satellites.

The smartphone 220 also includes a long-range communication circuit 232, a CMOS sensor 233, an imaging element I/F 234, a microphone 235, a speaker 236, an audio input/output (I/O) I/F 237, a display 238, an external device connection I/F 239, and a short-range communication circuit 240, an antenna 240*a* of the short-range communication circuit 240, and a touch panel 241.

Among these, the long-distance communication circuit 232 is a circuit that communicates with other devices via a communication network. The CMOS sensor 233 is a type of built-in imaging means or sensors that images a subject and obtains image data under the control of the CPU 221. The imaging element I/F 234 is a circuit that controls driving of the CMOS sensor 233. Microphone 235 is a built-in circuit that converts sound into electrical signals. The speaker 236 is a built-in circuit that converts electrical signals into physical vibrations to produce sounds such as music and voice. The audio I/O I/F 237 is a circuit that processes input/output of sound signals between the microphone 235 and the speaker 236 under the control of the CPU 221. The display 238 is a type of display means such as a liquid crystal or organic Electro Luminescence (EL) that displays images of the subject, various icons, and the like. The external device connection I/F 239 is an interface for connecting various external devices. The near field communication circuit 240 is a communication circuit such as Near Field Communication (NFC) or Bluetooth (registered trademark). The touch panel 241 is a type of input means or user interface by which the user operates the smartphone 220 by pressing the display 248.

The smartphone 220 also includes a bus line 230. The bus line 230 is an address bus, a data bus, etc. for electrically connecting each component such as the CPU 221 shown in FIG. 3.

Figure 4:
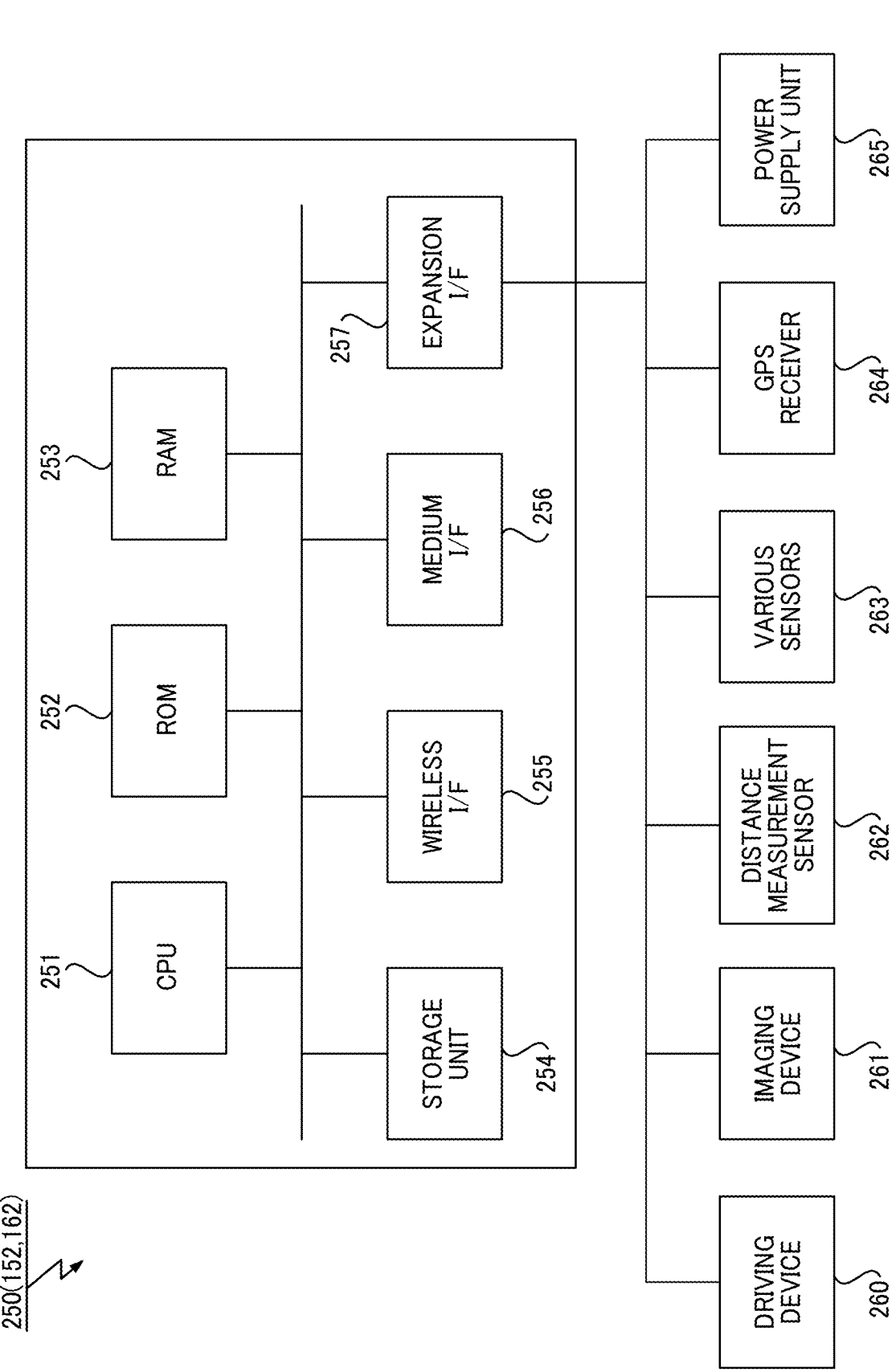
FIG. 4 is a hardware configuration diagram of a mobile object according to embodiments of the present disclosure.

FIG. 4 is a hardware configuration diagram of a mobile object 250 such as one of the drones 152 and/or one of the crawlers 162 according to embodiments of the present disclosure. As shown in FIG. 4, the mobile object 250 includes a CPU 251, a ROM 252, a RAM 253, a storage unit or memory 254, a wireless I/F 255, a medium I/F 256, and an expansion I/F 257.

The CPU 251 controls the operation of the entire mobile object 250. The ROM 252 stores programs such as IPL used to drive the CPU 251. RAM 253 is used as a work area for CPU 251. The storage unit 254 reads or writes various data such as drone program or crawler program under the control of the CPU 251. Wireless I/F 255 controls communication via wireless. The mobile object 250 can connect to other mobile object (other drones and other crawlers) and the mobile object control server 110 via a wireless I/F 255, and exchange various information. The medium I/F 256 controls reading or writing (storage) of data to a storage medium such as a flash memory. The expansion I/F 257 is an interface for connection with a module that provides expansion functions.

Furthermore, the mobile object 250 includes various devices connected via the expansion I/F 257, including a driving device 260, an imaging device or imager 261, a distance measurement sensor 262, various sensors 263, a GPS receiver 264, and a power supply unit or power supply 265.

The drive device 260 controls mechanisms used for movement, such as running devices such as caterpillars and wheels, and leg mechanisms. The imaging device 261 is a CMOS sensor or a CCD camera, and is a type of imaging device that captures the surrounding environment and acquire image data under the control of the CPU 251. The imaging device 261 may be, for example, a normal camera or a spherical camera. The distance measurement sensor 262 is an ultrasonic type or Time of Flight (TOF) type distance measurement sensor, and measures the distance to the object in front.

The various sensors 263 include, for example, an infrared temperature sensor for detecting a heat source, and may also include, for example, a smoke sensor for measuring smoke concentration in the case of the drones 152. The smoke sensor may be a sensor that detects the concentration or presence of smoke particles or smoke molecules (including gas components and odor molecules contained in smoke), and more specifically, a photoelectric sensing smoke sensor, an ionization sensor, semiconductor type and crystal oscillator type odor sensors etc. A fire may be detected by an infrared temperature sensor, or by image recognition processing from an image captured by an imaging device. When using an infrared temperature sensor, a threshold value may be set at a predetermined temperature (for example, 70 degrees) to detect the occurrence of a fire. In addition, the various sensors 263 may include one or more of a temperature/humidity sensor to measure temperature and humidity and a wind speed sensor, to acquire environmental information around the mobile object 152 and 162.

GPS receiver 264 receives GPS signals from GPS satellites. The power supply unit 265 supplies power from the battery to the mobile object. The drones 152 and the crawlers 162 often move long distances and for long periods of time. And for example, when the remaining battery level falls below a predetermined level, the drones 152 and the crawlers 162 can stop searching and return to the base or any desired location to charge. After charging, the same mobile object may return to the location where the search was stopped and resume patrolling, or a different mobile object may take over and resume patrolling.

Furthermore, since there may be obstacles in the forest, the mobile object 250, for example the crawlers 162, may be equipped with a manipulator, such as a robotic arm, to remove obstacles.

Figure 5:
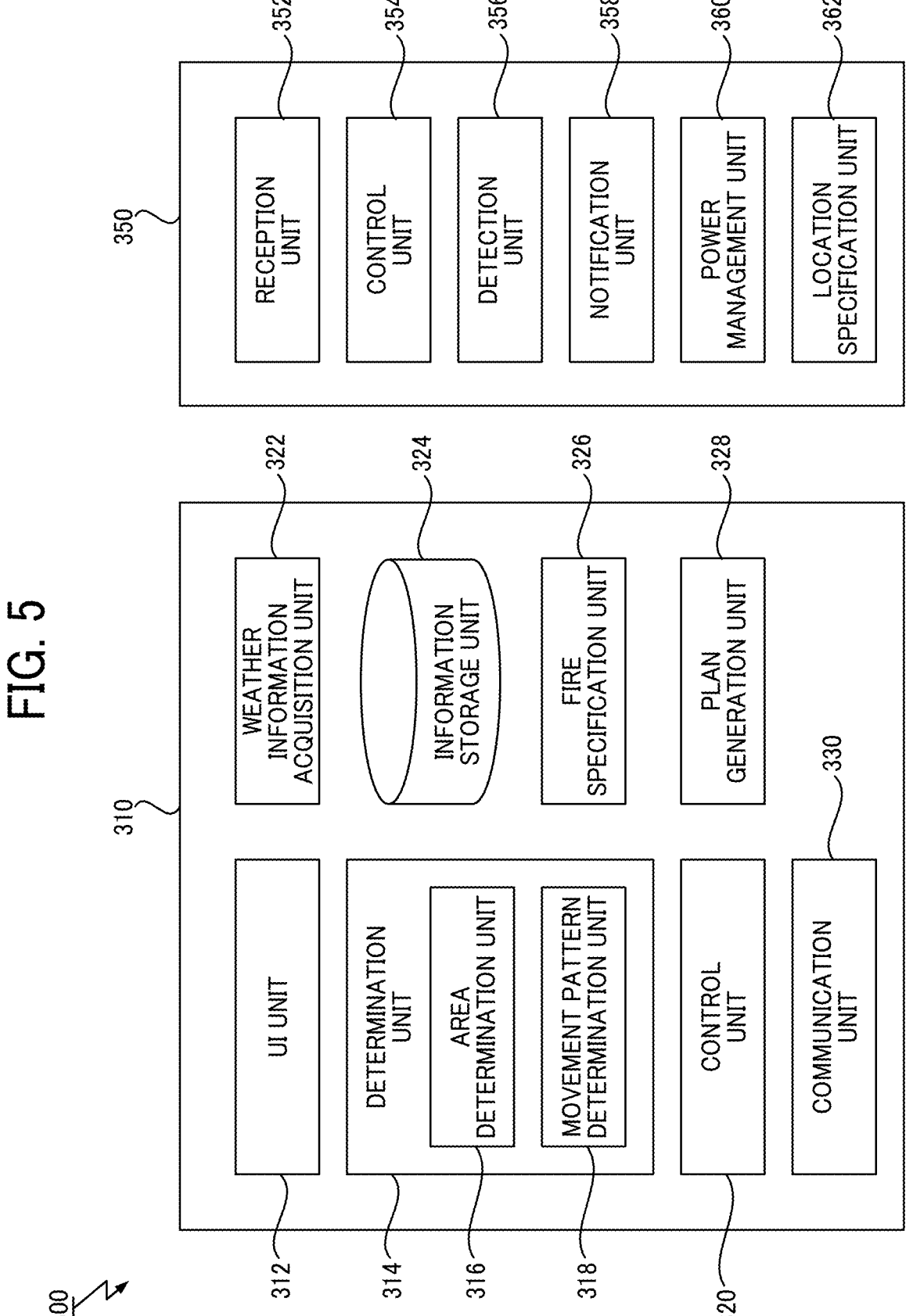
FIG. 5 is a functional block diagram illustrating the functional configuration of the disaster prevention system according to embodiments of the present disclosure.

The configuration of the disaster prevention system 100 of this embodiment of the present disclosure and the hardware configuration of the apparatus constituting the disaster prevention system 100 have been described above. Hereinafter, the functional configuration 200 of the disaster prevention system 100 will be explained based on the functional block diagram shown in FIG. 5. FIG. 5 shows a functional block 310 of the mobile object control server 110 and a functional block 350 of the mobile object (drones 152/crawlers 162).

The functional block 310 of the mobile object control server 110 according to this embodiments of the present disclosure includes a UI (User Interface) unit 312, a determination unit 314, a control unit 320, a weather information acquisition unit 322, an information storage unit or memory 324, a fire specification unit 326, a plan generation unit 328 and a communication unit 330.

The weather information acquisition unit 322 communicates with the weather information server 120, acquires weather information related to the target area from the weather information server 120, and stores the weather information in the information storage unit 324. Weather information is not particularly limited, but include information such as weather information and humidity information.

The information storage unit 324 stores area information regarding a plurality of areas to be searched and weather information regarding a plurality of areas acquired by the weather information acquisition unit 322. More specifically, the information storage unit 324 stores a history information of occurrences of past events in the area to be searched as area information, for example, the history information of past fire occurrences, and information on weather and humidity as meteorological information. The information storage unit 324 may also store, as the weather information, the information acquired by the weather information acquisition unit 322 from the weather information server 120, and environmental information (e.g., temperature, humidity, wind speed). The information storage unit 324 constitutes a storage unit in this embodiment.

The determination unit 314 makes various decisions regarding the search based on the information stored in the information storage unit 324. More specifically, the determination unit 314 includes an area determination unit 316 and a movement pattern determination unit 318.

The area determination unit 316 determines candidate areas to be searched based on the area information and weather information stored in the information storage unit 324. More specifically, the area determination unit 316 determines a candidate area based on history information of past fire occurrences and information of weather and humidity stored in the information storage unit 324. The area determination unit 316 determines the candidate area, preferably a candidate area with the highest priority (an area that has a high score for evaluating the probability of fire occurrence and should be searched with priority) as designated area to search by the mobile object, based on a predetermined algorithm. In other embodiments, the area determination unit 316, based on the predetermined algorithm, determines the plurality of candidate areas by calculating a priority score for each area, and provides the candidate areas and priority score for each area to the administrator terminal 130, and determines the designated area to search by the mobile object in response to the administrator's selection from a plurality of candidate areas.

The movement pattern determination unit 318 determines a movement pattern in the candidate area determined by the area determination unit 316. The accuracy of fire detection through search by the mobile object is in a trade-off relationship with the search time or the movement distance within the area, and movement patterns can be determined to set the accuracy of fire detection based on the priorities mentioned above. For example, a movement pattern may be a movement pattern that prioritizes shortening time or distance rather than improving accuracy when the priority is relatively low, or a movement pattern that prioritizes improving accuracy rather than shortening time or distance when the priority is relatively high. In addition, the movement pattern may be optimized to allow for maximum movement using the remaining battery capacity, depending on the terrain and the wind speed at that location. The movement pattern will be described in more detail later.

The UI unit 312 provides a graphical user interface for performing various operations in response to access from the administrator terminal 130. For example, the administrator can use an application or a browser on the administrator terminal 130 to access the mobile object control server 110 and perform various operations. For example, as described above, the UI unit 312 presents candidate areas with high priority for search to the administrator and receives the selection, and the UI unit 312 provides a notification to the administrator about the fire occurrences and related information when a notification of an occurrence of a fire is received. The UI unit 312 constitutes a notification unit in this embodiment. The administrator will be able to take evacuation and firefighting measures based on the received information.

The control unit 320 controls the movement of at least one mobile object among the drones 152 and the crawlers 162 based on the candidate area determined by the area determination unit 316. The number of mobile objects to be controlled may be one or multiple. Moreover, which mobile object is selected is arbitrary. For example, the UI unit 312 displays on the administrator terminal 130 one or more candidate areas that should be searched with priority, determined by the area determination unit 316, and the administrator selects the designated area to search among displayed candidate areas. The candidate areas may be ranked based on the priority. In this case, the designated area mentioned above is determined by the administrator's selection from among a plurality of candidate areas proposed by the UI unit 312 along with their priorities. Alternatively, the area determination unit 316 determine the designated area automatically from among the candidate areas. The control unit 320 controls the movement of the selected mobile object in the designated area selected by the user based on the candidate area or in the designated area automatically determined.

Although the specific control of the mobile object is not particularly limited, for example, a flight route or a driving route or a relay point which the mobile object passes through is preferably specified.

For example, when the area determination unit 316 determines the designated area as an area with a high risk of occurrence of a fire based on the analysis result of the current weather information, the control unit 320 may perform patrol monitoring of the designated area with priority or focus. The patrol monitoring with priority means that the designated area is patrolled earlier in time than other areas, or that the frequency of patrols is higher than other areas, or both. The patrol monitoring with focus means that the residence time in the designated area is longer than other areas.

Further, in a preferred embodiment, when the remaining power amount of the mobile object satisfies a predetermined condition, the control unit 320 stops the search for at least one mobile object, returns it to the charging base, and causes it to be charged, resumes the search from the location where the search was stopped by the same mobile object or a different mobile object waiting at the base.

The fire specification unit 326 specifies the location and scale of a fire based on information transmitted from at least one mobile object. The plan generation unit 328 generates a fire response plan and a route for carrying out the fire response plan in response to a notification of the occurrence of a fire from a mobile object. Specifying the location and scale of a fire, and creating the optimal route to generate and execute a fire response plan can be done automatically using artificial intelligence, based on a database that stores past fires. The location and scale of the fire specified by the fire specification unit 326 can be displayed on the administrator terminal 130 by the UI unit 312, for example.

The communication unit 330 receives, via the network 102, information about the occurrence of an event detected while the mobile object 250 is moving in a designated area, sent from the mobile object 250. Furthermore, the communication unit 330 can transmit various commands and control information to the mobile object 250 when the control unit 320 controls the movement of at least one mobile object.

With reference to FIG. 5, the configuration of the mobile object 250 will be described. The functional block 350 of the mobile object 250 according to this embodiment of the present disclosure includes a reception unit 352, a control unit 354, a detection unit 356, a notification unit 358, a power management unit 360, and a location specification unit 362.

The reception unit 352 receives information on the designated area transmitted from the mobile object control server 110. The location specification unit 362 uses a GPS receiver to specify the location of the mobile object. The control unit 354 performs drive control in the designated area received by the reception unit 352 based on the location information specified by the location specification unit. The control unit 354 may be implemented as a drive control unit in this embodiment. The detection unit 356 attempts to detect the occurrence of an event while the mobile object 250 is moving in the designated area. With these, the mobile object 250 patrol and monitor the designated area. The notification unit 358 notifies the mobile object control server 110 when the detection unit 356 detects the occurrence of an event. The power management unit 360 manages the remaining power amount.

As described above, the mobile object 250 has at least one module as hardware selected from the group consisting of, or alternatively including, a temperature sensor such as an infrared temperature sensor, an imaging device or imager 261 such as a normal camera or preferably an omnidirectional camera, a GPS receiver 264, and a smoke sensor. When the temperature sensor detects a temperature higher than a predetermined temperature, the notification unit 358 notifies to the mobile object control server 110, at least one information selected from the group consisting of, or alternatively including, location information measured by the GPS receiver 264, image information captured by the imaging device 261, and smoke information detected by the smoke sensor.

In the above configuration, for example, when one or more of the drones 152 detects a heat source (a temperature higher than a predetermined temperature) with an infrared sensor while the one or more of the drones 152 is moving in the designated area, the location of the heat source is specified from information received by the GPS receiver 264. the imaging device 261 captures an image (a still image, a moving image, or both) of the vicinity of the location. The one or more of the drones 152 transmit the heat source location information and image information to the mobile object control server 110. The mobile object control server 110 generates and provide a fire response plan using, according to one implementation, artificial intelligence. Furthermore, the mobile object control server 110 calculates the shortest route and steps or turns from the firefighting facility to the heat source location to carry out the fire response plan, and provides and displays it on a display of the administrator terminal 130, firefighter mobile terminals, and vehicle terminal.

Hereinafter, with reference to FIGS. 6 to 10, the control for disaster prevention using a mobile object, which is executed in the disaster prevention system 100 according to embodiments of the present disclosure, will be described in more detail.

FIGS. 6A and 6B are flowcharts illustrating the mobile object control process executed by the disaster prevention system 100 according to an embodiment of the present disclosure. In step S101 of FIG. 6A, the mobile object control server 110 determines the area to be searched and the movement pattern. The area and movement pattern determination process executed in step S101 will be described later with reference to FIG. 7. In step S102, the mobile object control server 110 instructs a predetermined mobile object 250 to search based on the determination in step S101, and advances the process to step S103. The instructions may include, for example, the movement pattern and route of the mobile object 250. Here, the selected mobile object is arbitrary, and depending on the settings, one or more of the drones 152 and/or one or more of the crawlers 162 starts searching.

The mobile object 250 waits in step S200 of FIG. 6B, and in response to an instruction from the mobile object control server 110 in step S102, the mobile object 250 starts a search process in step S201. In the described embodiment, for convenience of explanation, an instruction is given to one mobile object 250 in step S101, and the processing will be explained focusing on that one mobile object 250.

In step S201, the mobile object 250 starts searching. In step S202, the mobile object 250 determines whether or not a heat source has been detected while the mobile object 250 is moving in the designated area. For example, if an infrared sensor detects a place where the temperature is higher than a predetermined threshold temperature, or if a heat source is detected by image recognition from an image captured by the imaging device 261, the mobile object 250 determines that a heat source has been detected in step S202. If the mobile object 250 determines that no heat source has been found (NO) in step S202, the process advances to step S203.

In step S203, the mobile object 250 determines whether there is sufficient power remaining by the power management unit 360. If the mobile object 250 determines that the remaining power is greater than or equal to the predetermined threshold and is sufficient (YES) in step S203, the process returns to step S202. If the mobile object 250 determines that a heat source has been found (YES) in step S202, the process proceeds to step S204.

In step S204, the mobile object 250 specifies the location of the heat source and captures the heat source within its field of view. The heat source may be specified, for example, by the location determined by GPS of the mobile object 250 when the heat source is detected by an infrared temperature sensor. The image information to be captured may be a still image or a moving image. Furthermore, in addition to the captured image of the heat source, a captured image of the surrounding area may be acquired. In step S205, the mobile object 250 sends a heat source detection report to the mobile object control server 110 along with the identified heat source location and the captured image. In step S206, the mobile object 250 completes searching and returns to the base. Alternatively, observation of the area around the heat source may be continued, or a notification operation may be performed, if there is sufficient remaining power.

On the other hand, if it is determined that the remaining amount of power is less than the predetermined threshold and is not sufficient (NO) in step S203, the process branches to step S207. In step S207, the mobile object 250 stops searching and returns to the base. After returning to the base, the mobile object 250 returns to step S200, reports the return to the mobile object control server 110 as appropriate, and transitions to a standby state. The mobile object control server 110 may cause the same mobile object 250 that has completed charging or another mobile object 250 that has sufficient power remaining to resume the search.

Returning to the process on the mobile object control server 110, in step S103 of FIG. 6A, the mobile object control server 110 determines whether there is a heat source detection report. In step S103, if there is no heat source detection report yet (during NO), the process loops back to step S103. On the other hand, if the mobile object 250 detects a heat source, the heat source detection report is sent to the mobile object control server 110 together with the heat source location and the captured image in step S205.

If it is determined that the heat source detection report has been received (YES) in step S103, the process proceeds to step S104. In step S104, the mobile object control server 110 performs processing for sharing the received heat source location information and captured image information with the administrator. For example, the administrator receives notifications or emails on their smartphones. By accessing the mobile object control server 110 using the administrator terminal 130, the administrator can check the heat source location information on a map and view captured images. This allows the administrator to confirm the occurrence of a fire based on the heat source location information and the captured image, and to take appropriate measures such as dispatching a firefighter.

Furthermore, in a preferred embodiment, the mobile object control server 110 causes the plan generation unit 328 to generate a fire response plan and provide the fire response plan in step S105. In step S106, the shortest route to the heat source location for carrying out the generated fire response plan is searched and provided to the administrator, and the process ends. The administrator refers to the fire response plan and the shortest route by accessing the mobile object control server 110 using the administrator terminal 130. This makes it easier to take appropriate measures such as dispatching a firefighter.

Figure 7:
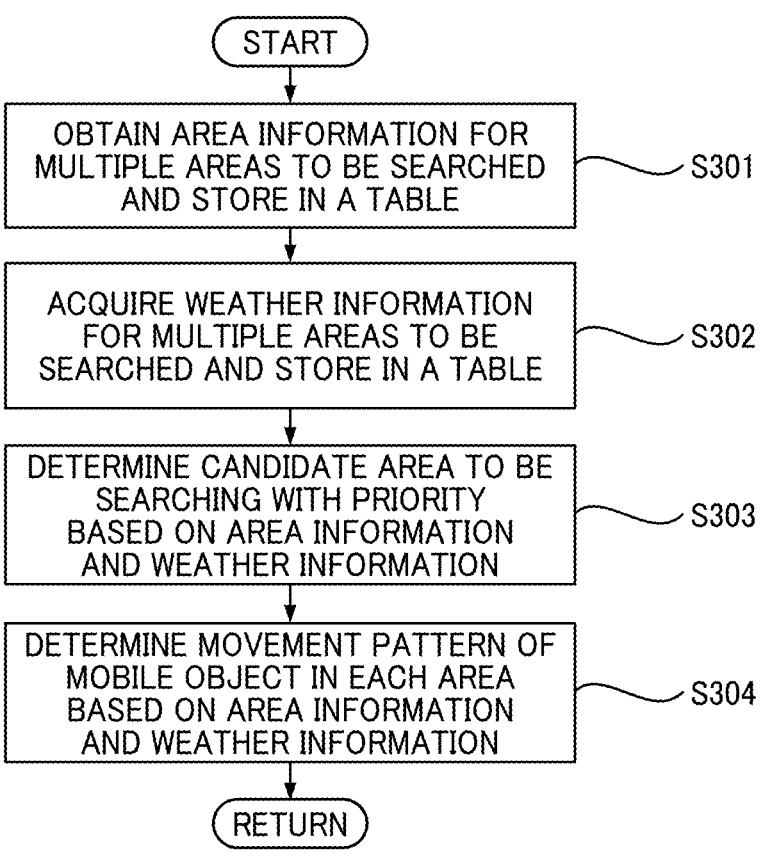
FIG. 7 is a flowchart illustrating candidate area and movement pattern determination process that is executed in the disaster prevention system according to embodiments of the present disclosure.

FIG. 7 is a flowchart illustrating the candidate area and movement pattern determination process that is executed in the disaster prevention system 100 according to an embodiment of the present disclosure, and called in step S101 of FIG. 6A. The process shown in FIG. 7 starts in response to being called at step S101 shown of FIG. 6A.

In step S301, the mobile object control server 110 obtains area information of multiple areas to be searched and stores it in a table.

Figure 8:
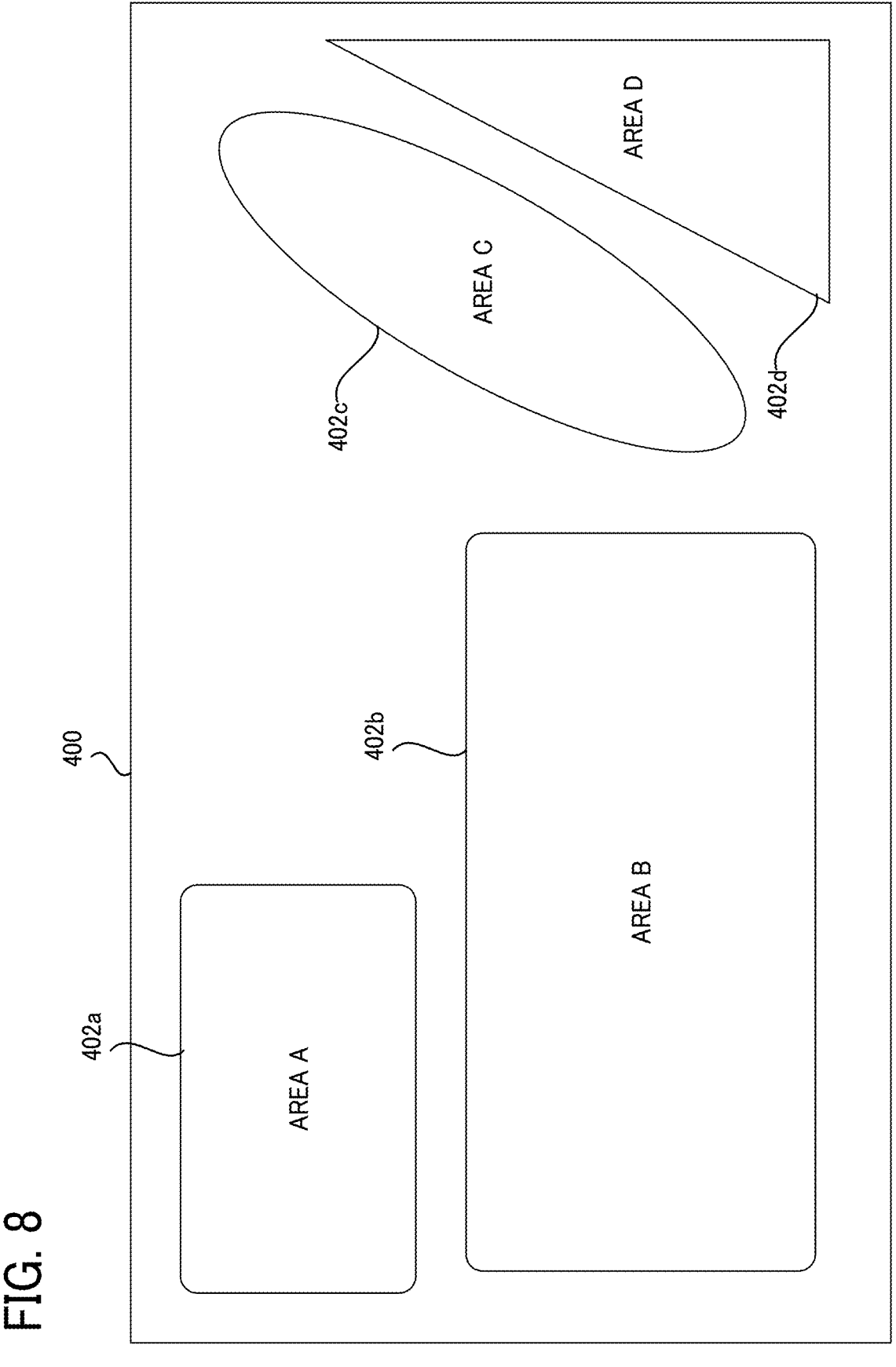
FIG. 8 is a diagram illustrating area information managed in the disaster prevention system according to embodiments of the present disclosure.

FIG. 8 is a diagram illustrating area information managed in the disaster prevention system 100 according to this embodiment of the present disclosure. Regarding the area information to be patrolled and monitored by the drones 152, predetermined table information is defined, prepared, and obtained in advance as a file by the administrator on the mobile object control server 110. In step S301, the mobile object control server 110 prepares a table storing area information in memory by reading the file. For example, for the entire forest area to be searched, map information of the forest (corresponding to latitude and longitude) is prepared, and each of the plurality of areas to be searched is set on the map. Areas A 402a to D 402d are shown in FIG. 8, and each area has a boundary line defined by latitude and longitude, for example. The area in which the crawlers 162 run is also defined in the same way as the drones 152.

The administrator can set the areas to be patrolled and monitored by the drones 152. In addition, at that time, the administrator can set areas to be patrolled and monitored with priority or focus based on past fire occurrence history, weather information, and information on area usage (such as file handing areas). Furthermore, the drones 152 can also be flown unmanned, so it is desirable to set the above-mentioned area in advance by taking safety into consideration so as not to fly over a densely populated area.

Referring to FIG. 7 again, in step S302, the mobile object control server 110 acquires weather information from the weather information server 120 for a plurality of areas to be searched, and stores it in a table. The weather information may include weather (sunny/cloudy/rainy, etc.), humidity, wind speed, and wind direction, and the weather information may be observed values or forecast values.

FIG. 9 is a diagram illustrating a table that stores area information and weather information in the disaster prevention system 100 according to this embodiment of the present disclosure. As shown in FIG. 9, a table or management table includes columns for area name, number of past fire occurrences, weather, humidity, wind speed, wind direction, movement pattern, and movement time zone. Here, regarding the number of past fire occurrences, the history of fires that occurred in the past in the area is stored. As forest fires have a variety of causes, it is possible to evaluate how likely they are to occur. Regarding the weather, humidity, wind speed, and wind direction values based on the weather information acquired from the weather information server 120 described above are stored.

For example, if the weather information server 120 provides weather information for each point in mesh units having a predetermined area, and if the area exists within a certain mesh, the weather information for that mesh can be used as information for the area. When the area spans a plurality of meshes, the aggregate value of the weather information of the plurality of meshes (any aggregation method such as the mode or average can be used) can be used as the information for the area. A mesh can be considered a collection of vertices, edges, and faces that defines the shape of an object or space.

The management table shown in FIG. 9 has a column "Including fire handling areas". For example, if the target area is a park, this stores a value that corresponds to information such as whether the area is strictly prohibited from using fire or not. According to the Fire and Disaster Management Agency statistical data, the number one cause of fires in Japan is bonfires at 30.2% and open burning at 17.5%. By registering in advance the use of fire for leisure (fire handling areas), it is possible to set a weight in the evaluation of the priority of that area. The travel time period in the management table will be described later, and the travel pattern will also be determined in a determination process that will be described later.

Referring again to FIG. 7, the mobile object control server 110 determines candidate areas to be searched with priority or focus based on area information and weather information of a plurality of search target areas in step S303. Regarding the candidate areas, the information in the management table may be scored to determine multiple areas as candidates (and the administrator select the designated area to be searched from among the candidate areas), or the information in the table may be scored to automatically determine the designated area to be searched.

Examples of automatic determination algorithms include:
(1) Schedule patrol and monitor areas where one or more fires have occurred in the past, in descending order of humidity;
(2) Set to patrol and monitor areas where one or more fires have occurred in the past and where the humidity is below a predetermined threshold (for example, 30%); and
(3) Extract all areas where the humidity is below a predetermined threshold (for example, 30%) and schedule patrol and monitor areas in descending order of wind speed.

The process shown in FIGS. 6A and 6B is a flow that focuses on one determined area, as described above, and when searching for multiple areas is scheduled, the process shown in FIGS. 6A and 6B is performed for each determined area.

In relation to the above-mentioned schedule, the administrator may specify a time zone in which the drones 152 and crawlers 162 are to be patrolled. In the table shown in FIG. 9, AM (morning)/PM (afternoon) is set as the movement time zone or time period. However, the method of specifying the movement time zone or time period is not particularly limited, and a specific time zone or time period (for example, 1:00 to 7:00) may be set, the date and time (December 1st to December 3rd) may be set, and multiple days may be set. When moving for a long period of time, operations such as the drones 152 and crawlers 162 returning to the base, charging, and returning to patrol may be necessary. In that case, a plurality of drones 152 or crawlers 162 may be rotated around. In addition to the above conditions, more complex conditions can be set (For example, if there is a history of forest fires occurring when sunny days continue for a predetermined number of days, the condition is set that sunny days continue for a predetermined number of days) by combining information on the weather (climate), where wildfires occurred in the past to predict in advance that the situation will be more dangerous, and to conduct intensive patrolling and monitoring on that specific dangerous day. This enables more efficient patrolling and monitoring. Alternatively, the mobile object 250 can monitor with priority or focus on a location where fires have occurred in the past, and the mobile object 250 can monitor with priority or focus if the environmental information (temperature, humidity, wind speed) collected by mobile object 250 is similar to data from when a fire occurred in the past, by comparing the environmental information and the past data.

Referring again to FIG. 7, the mobile object control server 110 determines the movement pattern of the mobile object 250 in each area based on the area information and weather information of the plurality of areas to be searched in step S304. The movement pattern of the drones 152 can be set individually for each area. Since the flight distance varies depending on the movement pattern, it is preferable to select a pattern with a short movement distance for an area where a long movement or long distance to travel is expected. Furthermore, it is preferable to set a pattern that is short in distance and does not require time for areas with little past fire occurrence history (areas with low priority). On the other hand, for areas with frequent fires in the past and areas with dense forests where it is difficult to detect fire sources on the ground (high-priority areas), it is better to set a pattern that allows for more comprehensive patrolling and monitoring, although the movement distance is long and it takes time.

FIGS. 10A-10D are diagrams illustrating the movement pattern of the mobile object determined according to embodiments of the present disclosure. FIG. 10A shows a movement pattern that progresses while reciprocating at approximately equal intervals between opposite ends of the outer peripheral portion of the area. FIG. 10B shows a movement pattern that progresses while reciprocating in a zigzag (diagonal) manner on opposite ends of the outer peripheral portion of the area. FIG. 10C shows a movement pattern that circulates along the outer periphery of the area. FIG. 10D shows a movement pattern that moves the area from one corner to the diagonal. FIG. 10A is a movement pattern that requires the longest movement distance and time, but is less likely to miss a fire. In FIG. 10D, the moving time becomes shorter and the scanning time becomes shorter as compared to FIGS. 10A-10C.

The movement pattern set for each area is not limited to one, and multiple patterns may be set for the same area, for example, in an ordered manner (for example, for an area A 402a illustrated in FIG. 8, there may be patrolling and monitoring using the pattern of FIG. 10A after patrolling and monitoring with the pattern of FIG. 10D.) Furthermore, the crawlers 162 can also patrol and monitor the ground using the same flight pattern as the drones 152. In addition, compared to the drones 152 that fly in the sky, the crawlers 162 that run on the ground may have restrictions on movement due to cliffs, rocks, rivers, lakes, and wetlands, so the actual movement of the crawlers 162 may be such that the crawlers 162 basically move along the determined movement pattern while taking the restrictions into consideration. Further, the movement pattern may be an optimized pattern that corresponds to the topography and the wind speed at the location so that the mobile object 250 can move as much as possible using the remaining battery capacity.

Furthermore, different movement patterns may be set for the same area for the drones 152 and for the crawlers 162. Furthermore, the drones 152 and the crawlers 162 may each set different movement time zones or periods and perform patrolling and monitoring at different timings. In the case of crawlers, when moving for a long time, the crawlers 162 will return to the crawler base 160 and be charged if the amount of electricity falls below a predetermined value, and the same crawlers 162 after charging or different crawlers 162 which are already charged may return to patrol and monitor.

Referring again to FIG. 7, after step S304, the main determination process is ended, and the process returns to the next step after step S101 in FIG. 6A.

In the above explanation, the operation of the mobile object 250 after the detection of a fire was explained as simply returning to the base, but it is not limited to this manner of operating. For example, after detecting a fire, the mobile object 250 may move to an alarm operation. For example, if the mobile object 250 is further equipped with an audio transmitter (for example, a speaker) or a light transmitter (for example, a lamp), the mobile object 250 automatically carry out notification operations such as transmitting a voice message at the site to notify of the outbreak of a fire, or emitting light to notify the outside of the danger when mobile object 250 detects a fire, or in response to instructions from the administrator. In addition to the alarm operation, depending on the performance of the mobile object 250, the mobile object 250 equipped with an extinguishing agent for initial extinguishing can perform initial response to fires such as dropping or spraying extinguishing agent using its own sensors or a command from a server or human.

Furthermore, when entering the forest, the wireless communication conditions may be poor, so the drones 152 and the crawlers 162 may be configured to communicate with each other when they are within a predetermined distance. For example, various controls may be performed via wireless communication with the drones 152 located above the crawlers 162.

Hereinafter, with reference to FIGS. 11A and 11B, another embodiment will be described in which the drones 152 and the crawlers 162 are linked to find a fire more efficiently. FIGS. 11A and 11B are flowcharts illustrating a mobile object control process executed by a disaster prevention system according to another embodiment. In step S401, the mobile object control server 110 determines the area to be searched and the movement pattern, as described with reference to FIG. 7. In step S402, the mobile object control server 110 instructs a predetermined crawler of the crawlers 162 to search based on the determination in step S401, and advances the process to step S403. Here, one of the crawlers 162 is instructed to start searching.

The crawlers 162 are on standby, and in response to the instruction from the mobile object control server 110 in step S402, the search process using the crawlers 162 is started in step S500.

In step S500, the crawlers 162 start searching. In step S501, the crawlers 162 determine whether or not the crawlers 162 have detected a heat source while moving in the designated area. If it is determined in step S501 that no heat source has been detected (NO), step S501 is looped. If it is determined in step S501 that a heat source has been detected (YES), the process proceeds to step S502. In the explanation here, control for returning to the base when the remaining amount of power becomes low may be performed but a flowchart showing this process is omitted.

In step S502, the crawlers 162 specify the location of the heat source and capture the heat source within its field of view. In step S503, the crawlers 162 send a heat source detection report to the mobile object control server 110 along with the specified heat source location (for example, the location specified by the GPS receiver 264) and the captured image captured by the imaging device 261. In step S504, the crawlers 162 complete searching and return to the base. Alternatively, on the condition that there is remaining power, observation of the area around the heat source may be continued, or a notification operation may be performed.

Returning to the processing of the mobile object control by the server 110, the mobile object control server 110 determines whether there is a heat source detection report in step S403. In step S403, if there is no heat source detection report yet (NO), the process loops to step S403. On the other hand, if the crawlers 162 detect a heat source, the heat source detection report is sent to the mobile object control server 110 together with the heat source location and the captured image in step S503. If it is determined that a heat source detection report has been received (YES) in step S403, the process proceeds to step S404.

In step S404, the mobile object control server 110 performs processing for sharing the received heat source location information and the received captured image information with the administrator. In step S405, the mobile object control server 110 instructs a predetermined drone of the drones 152 to search, and the process advances to step S406. Here, the start of a search for an appropriate one of the drones 152 is instructed. Further, the location coordinates of the crawler of the crawlers 162 that detected the heat source are set as the destination in the instruction.

The drone base 150 is on standby, and in response to the instruction from the mobile object control server 110 in step S405, search processing on the drone of the drones 152 is started in step S600.

In step S600, the drone of the drones 152 starts searching. In step S601, the drone of the drones 152 determines whether or not the drone of the drones 152 has arrived at a heat source, which is a designated destination, while moving in the designated area. If it is determined that the drone of the drones 152 has not arrived at a heat source (NO) in step S602, step S601 is looped. When the current location of the drone of the drones 152 is within a predetermined range of the destination, it is determined that the drone of the drones 152 has arrived. If it is determined that the drone of the drones 152 has arrived (YES) in step S601, the process proceeds to step S602. In addition, in the explanation here, control for returning to the base when the remaining amount of power becomes low is omitted.

In step S602, the drone of the drones 152 performs capturing and measurement of smoke density. When capturing, it is possible to capture the heat source within the field of view, or to capture the surroundings of the location where the heat source is thought to be. In step S603, the drone of the drones 152 sends a surrounding situation report to the mobile object control server 110 along with the captured image and the measured smoke density information. In step S604, the drone of the drones 152 completes searching and returns to the base. Alternatively, on the condition that there is remaining power, observation of the area around the heat source may be continued, or a notification operation may be performed.

Returning to the processing of the mobile object control server 110, the mobile object control server 110 receives the captured image and smoke density information in step S406. In step S407, the mobile object control server 110 performs processing for sharing the received captured image information and the received smoke density information with the administrator.

In a preferred embodiment, in step S408, the mobile object control server 110 uses the plan generation unit 328 to generate and provides a fire response plan. The mobile object control server 110 can calculate the scale of the fire by using the smoke density information. As a method for detecting the occurrence of a fire using smoke detection, for example, Japanese Patent Application Publication No. 2017-004101 is known, the teachings therein may be used, and is incorporated herein by reference. In step S409, the shortest route to the heat source location for carrying out the generated fire response plan is searched and provided to the administrator, and the process ends.

The process shown in FIGS. 11A and 11B has been described assuming that the crawlers 162 patrol and monitor in advance, and the drones 152 are dispatched to observe the surrounding area in response to the detection of a heat source by the crawlers 162. However, these relationships may be reversed. The drones 152 patrol and monitor in advance, and in response to the detection of a heat source by the drones 152 using an infrared sensor or the detection of a location with high smoke concentration using a smoke sensor, one or more crawlers of the crawlers 162 is dispatched to observe the vicinity of the heat source.

In the above configuration, both the crawlers 162 and the drones 152 send location information, and it is possible to link the location information of the drones 152 in the air and the crawlers 162 on the ground. For example, the location information of the drones 152 flying over the fire location has accuracy that includes a certain degree of spread, such as a "zone." On the other hand, the relative relationship between the crawlers 162 and the location of the occurrence of a fire can be easily grasped, and the location information can be "point." By combining the crawler's monitoring range (points) with the sky monitoring range (zone), it becomes possible to perform wide-ranging and accurate disaster prevention monitoring.

In addition, as a method of cooperation between the drones 152 and the crawlers 162 by linking the location information, for example, based on the location information of the drones 152, the crawler of the crawlers 162 located closest can be controlled so that it is positioned to approach the location of the drones 152. Alternatively, a plurality of crawlers 162 around the location of the drone of the drones 152 may be controlled so that their positions approach the location of the drone of the drones 152 at the same time. This makes it possible to efficiently and safely improve the accuracy of the fire location and the fire scale specification.

In the above description, the mobile object 250 (drones 152 and crawlers 162) is assumed to move autonomously under instructions from the mobile object control server 110. On the other hand, for example, the mobile object 250 may be configured to be operated by an administrator or another operator from the beginning or during autonomous movement. Another embodiment in which an administrator or other operator operates the mobile object 250 will be described below with reference to FIGS. 12 to 15. The configuration similar to those of the embodiment shown in FIGS. 1 to 11 will be omitted, and the following description will focus on the differences.

Figure 12:
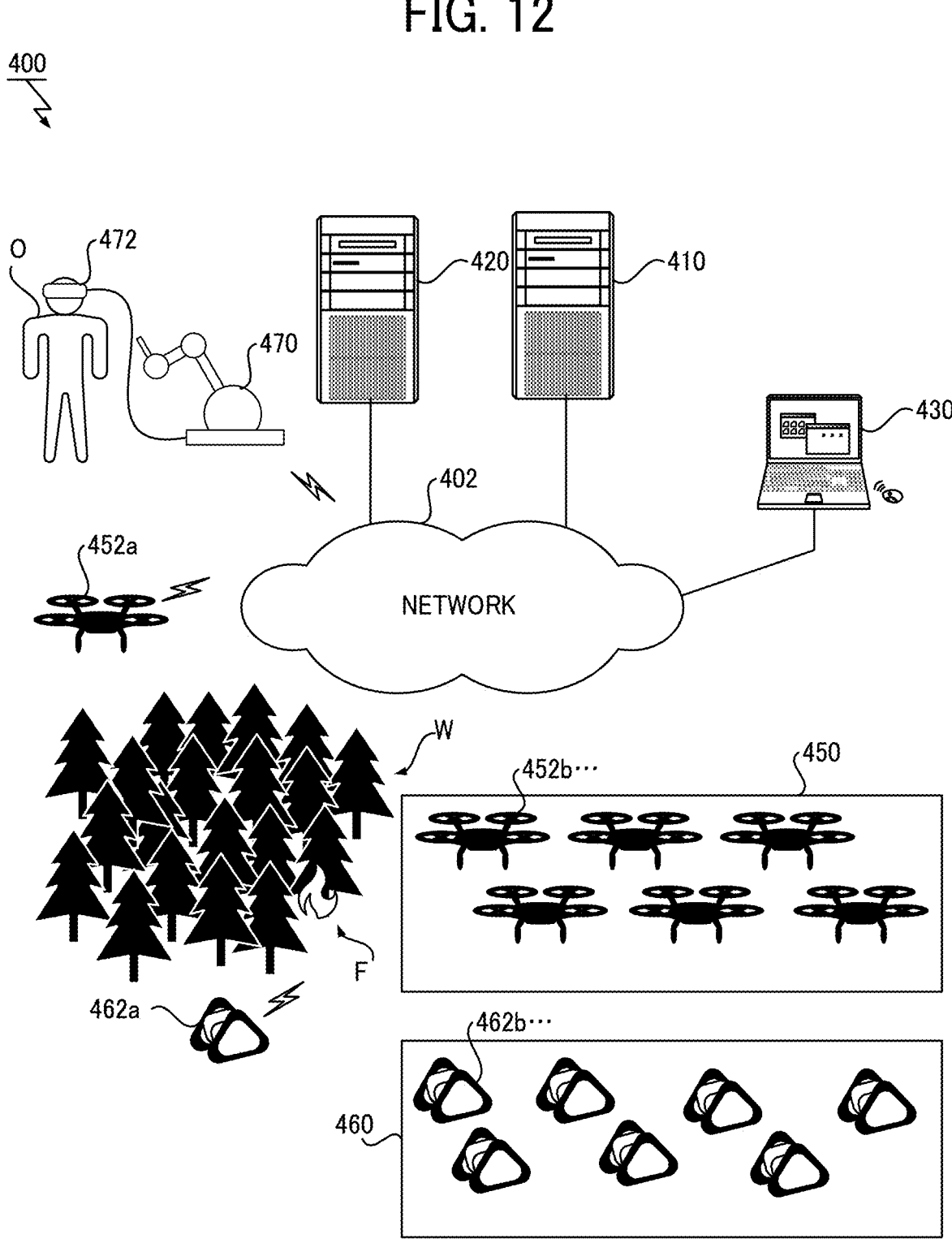
FIG. 12 is a diagram illustrating the overall configuration of the disaster prevention system according to another embodiment.

FIG. 12 is a diagram illustrating the overall configuration of a disaster prevention system 400 according to another embodiment. As shown in FIG. 12, the disaster prevention system 400 includes a mobile control server 410, a weather information server 420, an administrator terminal 430, drones 452, crawlers 462, and haptic device 470 which is an operation device connected to network 402. The haptic device 470 may be implemented as a joystick, or a joystick-type of device which has the ability to provide haptic feedback to an operator using motors, vibration motors, linear actuators, and the like.

The haptic device 470 is connected to a head-mounted display (HMD) 472, which is a display device worn by the operator O. The HMD 472 displays, for example, captured images sent from the mobile objects 452 and 462, information on various sensors of the mobile objects 452 and 462, information regarding the operating status. By viewing the image displayed on the HMD 472, the operator O of the haptic device 470 can operate the haptic device 470 while visually grasping the status of the remote mobile object 452 and 462.

The HMD 472 has a direction sensor and a display screen. The HMD 472 is fixed to the head of the operator O, and the direction sensor moves together with the head of the operator O to detect the direction in which the head of the operator O moves. Various images are displayed on the display screen of the HMD 472. The display screen displays an image so as to face the eyes of operator O. The HMD 472 can change the display location of the image in conjunction with the detection result of the direction sensor. The display device is not limited to the HMD 472, but may be a desktop type display in which the display location can be changed using a pointing device such as a mouse or a keyboard.

In this embodiment, an example will be described in which a captured image of the surroundings of the mobile objects 452/462 are displayed on the display screen. A cursor is displayed at a position synchronized with the location and posture input from the operator O by the handle of the haptic device 470. Then, the three-dimensional display location is changed in conjunction with the movement of the head of the operator O wearing the HMD 472. This allows the operator O to operate the mobile objects 452, 462 while viewing the surrounding environment and changing the location and angle three-dimensionally.

The haptic device 470 can perform haptic feedback, for example, giving the user a tactile sensation of pushing back the controller when the distance sensor is close to an obstacle, or giving the controller a tactile sensation that pushes the controller back when the wind speed is strong based on the wind speed detection results if the mobile objects 452 and 462 are equipped with a wind speed sensor. The hardware configuration of the haptic device 470 may be the same as that of a computer as shown in FIG. 2.

Figure 13:
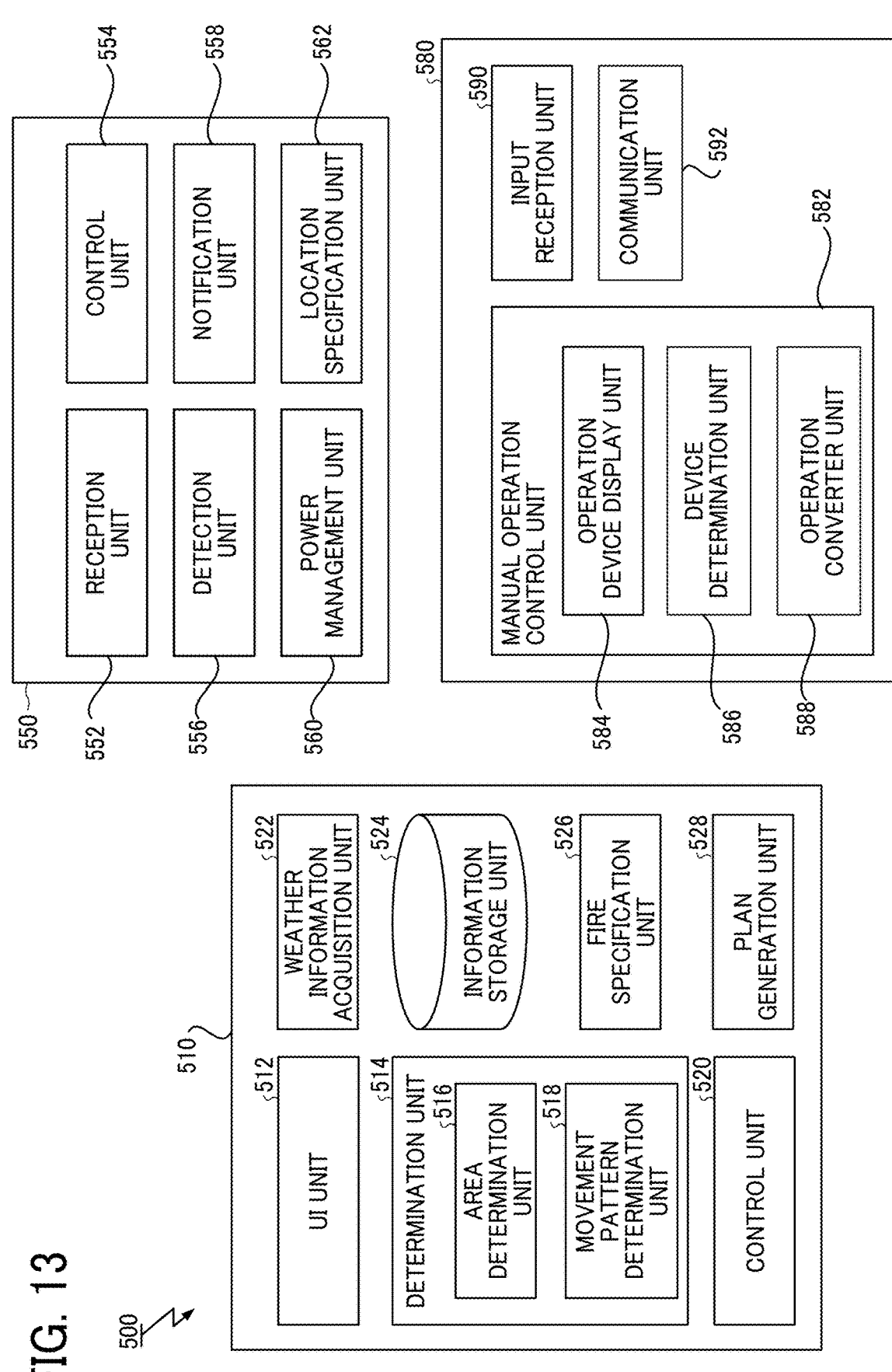
FIG. 13 is a functional block diagram illustrating the functional configuration of the disaster prevention system according to another embodiment.

Hereinafter, a functional configuration 500 of a disaster prevention system 400 according to another embodiment will be described based on the functional block diagram shown in FIG. 13. FIG. 13 shows a functional block 510 of the mobile object control server 410, a functional block 550 of the mobile object 452 and 462, and a functional block 580 of the haptic device 470.

The functional block 510 of the mobile object control server 410 and the functional blocks 550 of the mobile objects 452 and 462 according to this embodiment are similar to those shown in FIG. 5. The functional block 580 of the haptic device 470 will be described below. As shown in FIG. 13, the functional block 580 of the haptic device 470 includes a manual operation control unit 582, an input reception unit 590, and a communication unit 592.

The input reception unit 590 receives manual operation instructions from the operator. The manual operation control unit 582 includes an operation device display unit 584, a device determination unit 586, and an operation converter unit 588.

When the input reception unit 590 receives a manual operation instruction, the operating device display unit 584 displays the previously registered operating devices (keyboard, pointing device, controller, haptic device 470). In controlling the drones 452 or the crawlers 462, an appropriate device such as the haptic device 470 may be registered in advance for areas that require delicate operations. Then, when the mobile objects 452 or 462 enter the area, the registered device may be displayed.

Upon receiving the device selection from the input reception unit 590, the device determination unit 586 outputs the operation of the selected device to the operation converter unit 588. When the operation converter unit 588 receives the device operation from the input reception unit 590, the operation converter unit 588 converts the device operation into a control signal in order to control the mobile object 452 and 462 according to the device input from the device determination unit 586, and output the control signal to the communication unit 592.

The communication unit 592 transmits the control signal to the mobile objects 452 and 462. The haptic device 470 and the mobile objects 452 and 462 may communicate directly via the network 402 or may communicate via the mobile object control server 410.

Figure 14:
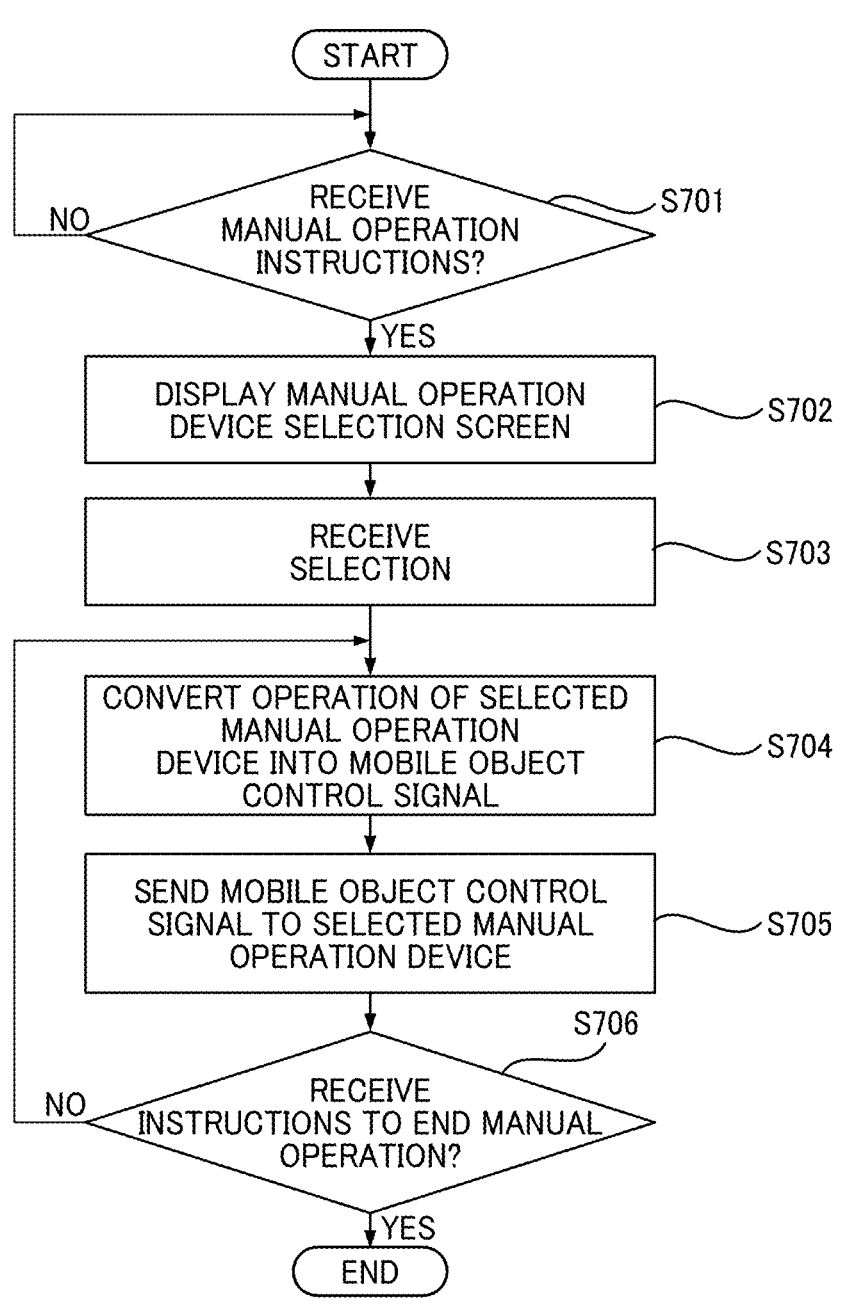
FIG. 14 is a flowchart illustrating a mobile object operation process executed by a haptic device according to another embodiment.

FIG. 14 is a flowchart illustrating the operation process for the mobile object executed by the haptic device 470 according to another embodiment.

In step S701, the haptic device 470 determines whether the input reception unit 590 has received one or more manual operation instructions. Step S701 is looped until a manual operation instruction is received (during NO). If it is determined that a manual operation instruction has been received (YES) in step S701, the process proceeds to step S702.

In step S702, the operating device display unit 584 display a manual operation device selection screen. In step S702, the operating device display unit 584 displays the operating devices (keyboard, pointing device, controller, haptic device 470) registered in advance. FIG. 15 is a diagram illustrating a table that stores recommended areas for various operating devices. As mentioned above, for example, an appropriate device such as the haptic device 470 may be registered in advance for areas where delicate operations are required to control the drones 452 and/or the crawlers 462, as shown in FIG. 15. Then, when at least one of the mobile objects 452 or 462 enters the area, the registered device may be provided.

In step S703, the haptic device 470 receives a selection of the device from the input reception unit 590 and outputs the selection result to the operation converter unit 588. In step S704, when the haptic device 470 receives a device operation from the input reception unit 590, the operation converter unit 588 converts the device operation into the control signal for controlling at least one of the mobile objects 452, 462 according to the device input from the device determination unit 586 and output to the communication unit 592. In step S705, the haptic device 470 sends the control signal to at least one of the mobile objects 452, 462 using the communication unit 592.

In step S706, it is determined whether an instruction to end the manual operation has been received, and step S704 is looped until the instruction to end the manual operation is received. If it is determined in step S706 that the instruction to end the manual operation has been received (YES), the process ends.

Embodiments of the present disclosure have been described above. According to the embodiments described above, it becomes possible to provide a mobile object control system, an information processing device, a mobile object, for searching an area where an event is likely to occur, and for detecting the occurrence of an event efficiently and as early as possible, by the mobile object.

According to the embodiments described above, it becomes possible to identify areas to be patrolled and monitored with priority based on the past forest fire history and the weather information, and detect the occurrence of events such as forest fires by one or more mobile objects, preferably by automatic flight or automatic driving. It is possible to detect the source of fires without much human effort by patrolling and monitoring with priority for areas where there is a high possibility of occurrence of events such as forest fires based on the past forest fire history and the weather information.

It is inefficient and difficult to manually patrol and monitor vast forest areas on the ground layer for initial detection. In addition, it may be difficult to find the source of a fire from the air by an unmanned flying mobile object in the early stages in dense forests. Furthermore, depending on the weather conditions, the unmanned flying mobile object cannot fly stably.

By using an unmanned flying mobile object as a mobile object, although not under all weather conditions, it becomes possible to monitor the entire area from a bird's-eye view much more efficiently than ground exploration, to increase effectiveness dramatically. By combining and utilizing multiple unmanned flying mobile objects for aerial monitoring, it becomes possible to monitor vast areas much more reasonably and easily than with aircraft. In addition, by using a combination of unmanned ground mobile objects, the monitoring range of unmanned ground mobile object (points) and the aerial monitoring range of unmanned flying mobile objects (zones) can be combined for wide-ranging and accurate disaster prevention monitoring.

According to the disaster prevention system according to the embodiments described above, it is possible to detect as early as possible the occurrence of events such as forest fires and wildfires that lead to large-scale disasters. Although the mobile control system according to embodiments of the present disclosure is suitably applicable to the occurrence of events such as forest fires and wildfires, the mobile control system of the present disclosure is generally applicable to other events that require disaster prevention.

The functionality of the elements disclosed herein may be implemented using circuitry or processing circuitry which includes general purpose processors, special purpose processors, integrated circuits, ASICs ("Application Specific Integrated Circuits"), digital signal processors (DSPs), field programmable gate arrays (FPGAs), a CPU (a Central Processing Unit), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Aspects of the present disclosure are, for example, as follows.

According to a first aspect, a mobile object control system comprising one or more mobile objects, an information processing apparatus communicable with the one or more mobile objects, control the one or more mobile objects, the information processing apparatus comprising first circuitry being configured to store area information including past event occurrence history information of an area to be searched by the one or more mobile objects and weather information regarding the area; determine a designated area to search based on the area information and the weather information; control the movement of at least one of the one or more mobile objects based on the designated area; the one or more mobile object comprising second circuitry being configured to detect occurrence of event while moving in the designated area; send a notification in case that detecting the occurrence of the event.

According to a second aspect, the mobile object control system of the first aspect, wherein the first circuitry is further configured to determine a candidate area to be searched based on the area information and the weather information, in case that receiving a selection of the candidate area from user, determine the designated area based on the selected candidate area.

According to a third aspect, the mobile object control system of the first aspect, wherein the occurrence of event is occurrence of fire; the first circuitry is further configured to store the area information including information of past fire occurrence history and the weather information including information of weather and humidity; determine the designated area based on information of the past fire occurrence history and the information of weather and humidity.

According to a fourth aspect, the mobile object control system of the first aspect, wherein the first circuitry is further configured to determine a movement pattern in the designated area;

According to a fifth aspect, the mobile object control system of the first aspect, wherein the second circuitry is further configured to manage remaining power amount; the first circuitry is further configured to in case that the remaining power amount of at least one mobile object satisfies a predetermined condition, control the at least one mobile object to stop the search, control the at least one mobile object to return to a charging base to charge, control the at least one mobile object to resume the search from location where the search was stopped.

According to a sixth aspect, the mobile object control system of the first aspect, wherein the occurrence of event is occurrence of fire; the mobile object further comprising temperature sensor; at least one of an imaging device, a GPS receiver, a smoke sensor; in case that the temperature sensor detects a temperature equal to or higher than a predetermined temperature, send, to information processing apparatus, information of at least one of location information measured by the GPS receiver, the image information captured by the imaging device, the smoke information detected by the smoke sensor; the first circuitry is further configured to specify location and scale of the occurrence of fire based the information sent from the mobile object;

According to a seventh aspect, the mobile object control system of the first aspect, wherein the second circuitry is further configured to specify location of the mobile object; receive information about the designated area sent from the information processing apparatus; control the movement of the one or more mobile object in the designated area based on the location;

According to an eighth aspect, the mobile object control system of the first aspect, wherein the one or more mobile objects include at least one unmanned flying mobile object and at least one unmanned ground mobile object, and the at least one unmanned flying mobile object and the at least one unmanned ground mobile object communicate with each other within a predetermined distance.

According to a nineth aspect, the mobile object control system of the first aspect, wherein the one or more mobile objects include at least one unmanned flying mobile object and at least one unmanned ground mobile object, and the at least one unmanned flying mobile object and the at least one unmanned ground mobile object comprising specify location of the at least one unmanned flying mobile object or the at least one unmanned ground mobile object send location information indicating the location to the information processing apparatus, the first circuitry is further configured to control a position of the at least one unmanned flying mobile object or the at least one unmanned ground mobile object based on the location information.

According to a tenth aspect, the mobile object control system of the first aspect, wherein the first circuitry is further configured to determine the designated area to designate the search for the at least one mobile object based on a predetermined algorithm.

According to an eleventh aspect, the mobile object control system of the first aspect, wherein the occurrence of event is occurrence of fire; the first circuitry is further configured to generate a fire response plan and a route for executing the fire response plan in response to the notification of the occurrence of the fire.

According to a twelfth aspect, the mobile object control system of the first aspect, further comprising: an operation device that operates the at least one mobile object.

According to a thirteenth aspect, the mobile object control system of the first aspect, wherein the one or more mobile objects include at least one of an unmanned flying mobile object and an unmanned ground mobile object.

According to a fourteenth aspect, an information processing apparatus communicable with one or more mobile objects, control the one or more mobile objects, comprising first circuitry being configured to store area information including past event occurrence history information of an area to be searched by the one or more mobile objects and weather information regarding the area; determine a designated area to search based on the area information and the weather information; control the movement of at least one of the one or more mobile objects based on the designated area; receive an information about the occurrence of the event detected while the at least one mobile object is moving in the designated area, sent from the at least one mobile object; in case that the information is received, notify the occurrence of the event to administrator.

According to a fifteenth aspect, a mobile object communicates with an information processing device via a network and operated under the control of an information processing apparatus, comprising circuitry being configured to specify location of the mobile object; control the movement of the mobile object based on the location information in response to instruction based on designated area determined by the information processing apparatus based on area information including past event occurrence history information of an area to be searched and weather information regarding the area; detect occurrence of event while the mobile object is moving in the designated area; send a notification in case that detecting the occurrence of the event.

According to an aspect, it is possible to preferentially search for an area where an event is likely to occur using a mobile object, which makes it possible to detect the occurrence of an event efficiently and as early as possible.

According to another aspect, by determining suitable movement patterns, it is possible to improve efficiency in terms of time and power consumption of searching for fire or other occurrences or objects.

The above described implementations can be used to improve the accuracy of fire or object determination and scale predictions.

According to yet another aspect, the movement of one or more mobile objects in the designated area can be controlled based on the location.

The invention claimed is:

1. A mobile object control system comprising:
one or more mobile objects,
an information processing apparatus communicable with the one or more mobile objects, and to control the one or more mobile objects:
the information processing apparatus comprising:
first circuitry configured to:
store area information including past event occurrence history information of an area to be searched by the one or more mobile objects and weather information regarding the area;
determine a designated area to search based on the area information and the weather information; and
control the movement of at least one of the one or more mobile objects based on the designated area,
the one or more mobile objects comprising:
second circuitry configured to:
detect an occurrence of an event while moving in the designated area; and
send a notification in case that the occurrence of the event is detected.

2. The mobile object control system of claim 1, wherein the first circuitry is further configured to:
determine a candidate area to be searched based on the area information and the weather information; and
determine, in case that receiving a selection of the candidate area from user, the designated area based on the selected candidate area.

3. The mobile object control system of claim 1, wherein:
the occurrence of the event is an occurrence of fire,
the first circuitry is further configured to:
store the area information including information of past fire occurrence history and the weather information including information of weather and humidity; and
determine the designated area based on information of the past fire occurrence history and the information of the weather and the humidity.

4. The mobile object control system of claim 1, wherein the first circuitry is further configured to:
determine a movement pattern in the designated area.

5. The mobile object control system of claim 1, wherein:
the second circuitry is further configured to manage a remaining power amount, and
the first circuitry is further configured to:
in case that the remaining power amount of at least one mobile object of the one or more mobile objects satisfies a predetermined condition, control the at least one mobile object to stop the search;
control the at least one mobile object to return to a charging base to charge; and control the at least one mobile object to resume the search from a location where the search was stopped.

6. The mobile object control system of claim 1, wherein:

the occurrence of the event is an occurrence of fire;

the mobile object further comprising:

a temperature sensor; and at least one of an imager, a GPS receiver, and a smoke sensor, wherein in a case that the temperature sensor detects a temperature equal to or higher than a predetermined temperature, the second circuitry sends, to the information processing apparatus, information of at least one of location information measured by the GPS receiver, image information captured by the imager, and smoke information detected by the smoke sensor;

the first circuitry is further configured to:

specify a location and scale of the occurrence of fire based the information sent from the mobile object.

7. The mobile object control system of claim 1, wherein the second circuitry is further configured to:

specify a location of the mobile object;

receive information about the designated area sent from the information processing apparatus; and control the movement of the one or more mobile object in the designated area based on the location.

8. The mobile object control system of claim 1, wherein:

the one or more mobile objects include at least one unmanned flying mobile object and at least one unmanned ground mobile object, and the at least one unmanned flying mobile object and the at least one unmanned ground mobile object communicate with each other when within a predetermined distance.

9. The mobile object control system of claim 1, wherein:

the one or more mobile objects include at least one unmanned flying mobile object and at least one unmanned ground mobile object, and the at least one unmanned flying mobile object and the at least one unmanned ground mobile object comprise circuitry configured to:

specify a location of the at least one unmanned flying mobile object or the at least one unmanned ground mobile object; and send location information indicating the location to the information processing apparatus, the first circuitry is further configured to:

control a position of the at least one unmanned flying mobile object or the at least one unmanned ground mobile object based on the location information.

10. The mobile object control system of claim 1, wherein: the first circuitry is further configured to:

determine the designated area to designate the search for the at least one mobile object based on a predetermined algorithm.

11. The mobile object control system of claim 1, wherein:

the occurrence of the event is an occurrence of fire, and the first circuitry is further configured to:

generate a fire response plan and a route for executing the fire response plan in response to the notification of the occurrence of the fire.

12. The mobile object control system of claim 1, further comprising;

a user interface to operate the at least one mobile object.

13. The mobile object control system of claim 1, wherein:

the one or more mobile objects include at least one of an unmanned flying mobile object and an unmanned ground mobile object.

14. An information processing apparatus communicable with one or more mobile objects, and for controlling the one or more mobile objects, comprising:

first circuitry configured to:

store area information including past event occurrence history information of an area to be searched by the one or more mobile objects and weather information regarding the area;

determine a designated area to search based on the area information and the weather information;

control a movement of at least one of the one or more mobile objects based on the designated area;

receive information about an occurrence of an event detected while the at least one mobile object is moving in the designated area, sent from the at least one mobile object; and in case that the information is received, notify the occurrence of the event to administrator.

15. A mobile object for communicating with an information processing device via a network and operated under the control of an information processing apparatus, comprising:

circuitry configured to:

specify a location of the mobile object;

control the movement of the mobile object based on the location information in response to an instruction based on a designated area determined by the information processing apparatus based on area information including past event occurrence history information of an area to be searched and weather information regarding the area;

detect an occurrence of an event while the mobile object is moving in the designated area; and send a notification in case that the occurrence of the event is detected.

* * * * *